United States Patent [19]

Funada

[11] Patent Number: 5,075,788
[45] Date of Patent: Dec. 24, 1991

[54] IMAGE QUALITY CONTROL APPARATUS CAPABLE OF DENSITY-CORRECTING PLURAL AREAS OF DIFFERENT TYPES

[75] Inventor: Masahiro Funada, Yokohama, Japan

[73] Assignee: Canon Kabushiki Kaisha, Tokyo, Japan

[21] Appl. No.: 442,854

[22] Filed: Nov. 29, 1989

Related U.S. Application Data

[62] Division of Ser. No. 81,721, Aug. 4, 1987, Pat. No. 4,903,145.

[30] Foreign Application Priority Data

Aug. 6, 1986 [JP] Japan .................................. 61-184557
Aug. 6, 1986 [JP] Japan .................................. 61-184558
Aug. 6, 1986 [JP] Japan .................................. 61-184565

[51] Int. Cl.$^5$ ............................................. H04N 1/40
[52] U.S. Cl. ..................................... 358/458; 358/462
[58] Field of Search .................. 358/75, 80, 457, 458, 358/462

[56] References Cited

U.S. PATENT DOCUMENTS

| | | | |
|---|---|---|---|
| 4,651,293 | 3/1987 | Kato | 358/457 X |
| 4,686,579 | 8/1987 | Sakanoto | 358/462 X |
| 4,723,173 | 2/1988 | Tanioka | 358/457 |
| 4,731,662 | 3/1988 | Udagawa et al. | 358/75 |
| 4,734,782 | 3/1988 | Maeshima | 358/457 X |
| 4,772,911 | 9/1988 | Sasaki et al. | 358/75 X |
| 4,821,334 | 4/1989 | Ogino et al. | 358/457 X |

Primary Examiner—James J. Groody
Assistant Examiner—Mark R. Powell
Attorney, Agent, or Firm—Fitzpatrick, Cella, Harper & Scinto

[57] ABSTRACT

An image processing apparatus includes a CCD image reader for reading image data of an original image, histogram calculators for correcting a density of the image data output from the CCD image reader, a digitizer for designating an arbitrary area of the original image, and selectors for selecting different density correction modes for an area designated by the digitizer and a remaining area. The histogram calculators have photograph and character area designation modes.

32 Claims, 23 Drawing Sheets

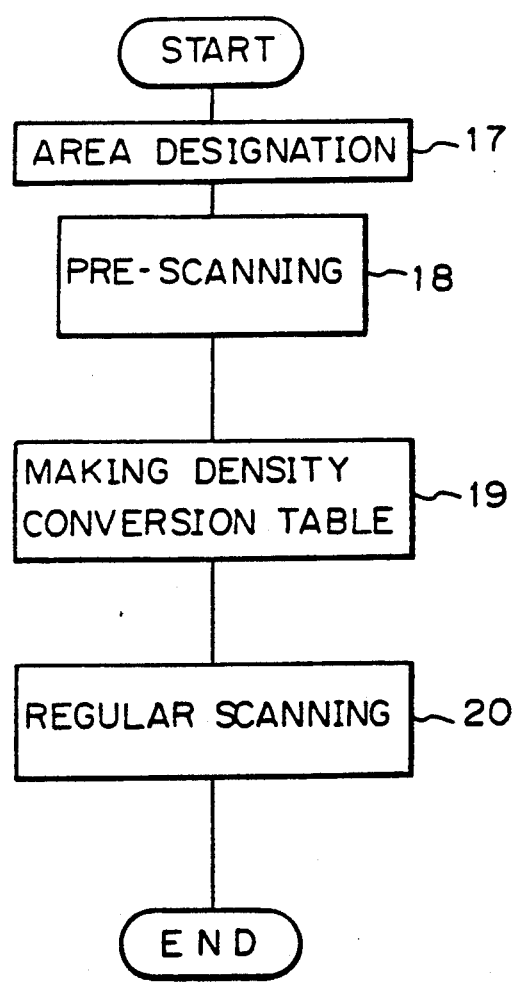

0: CHARACTER AREA
1: PHOTOGRAPH AREA

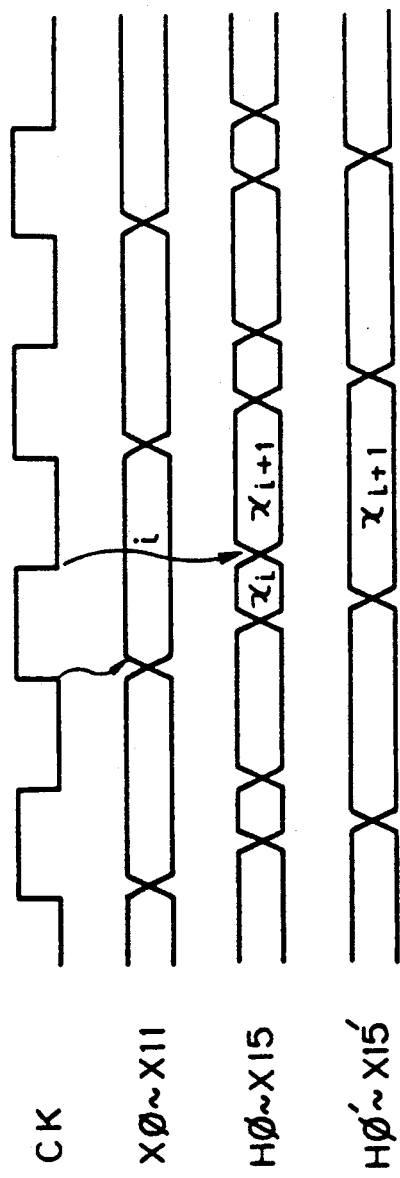

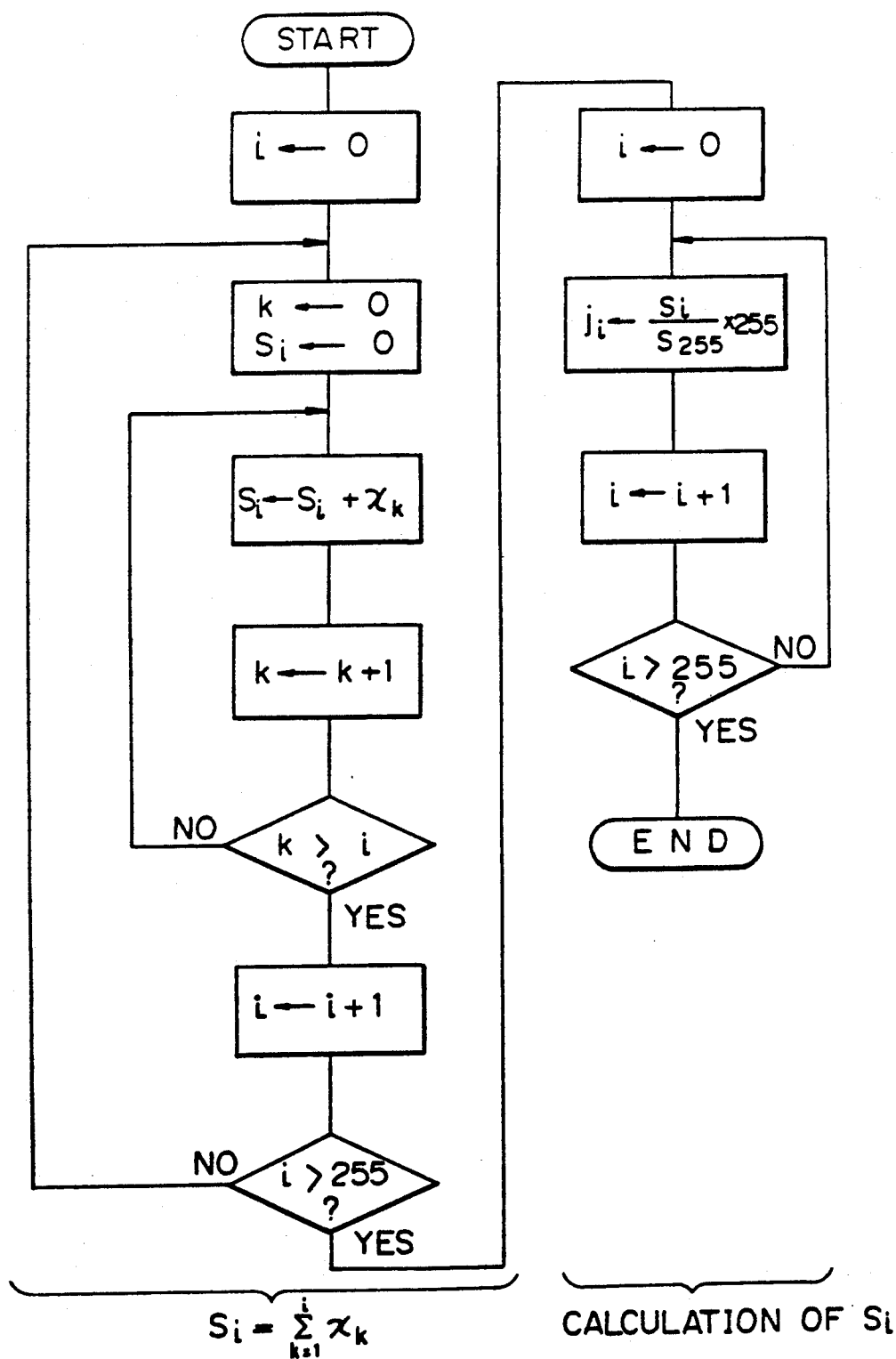

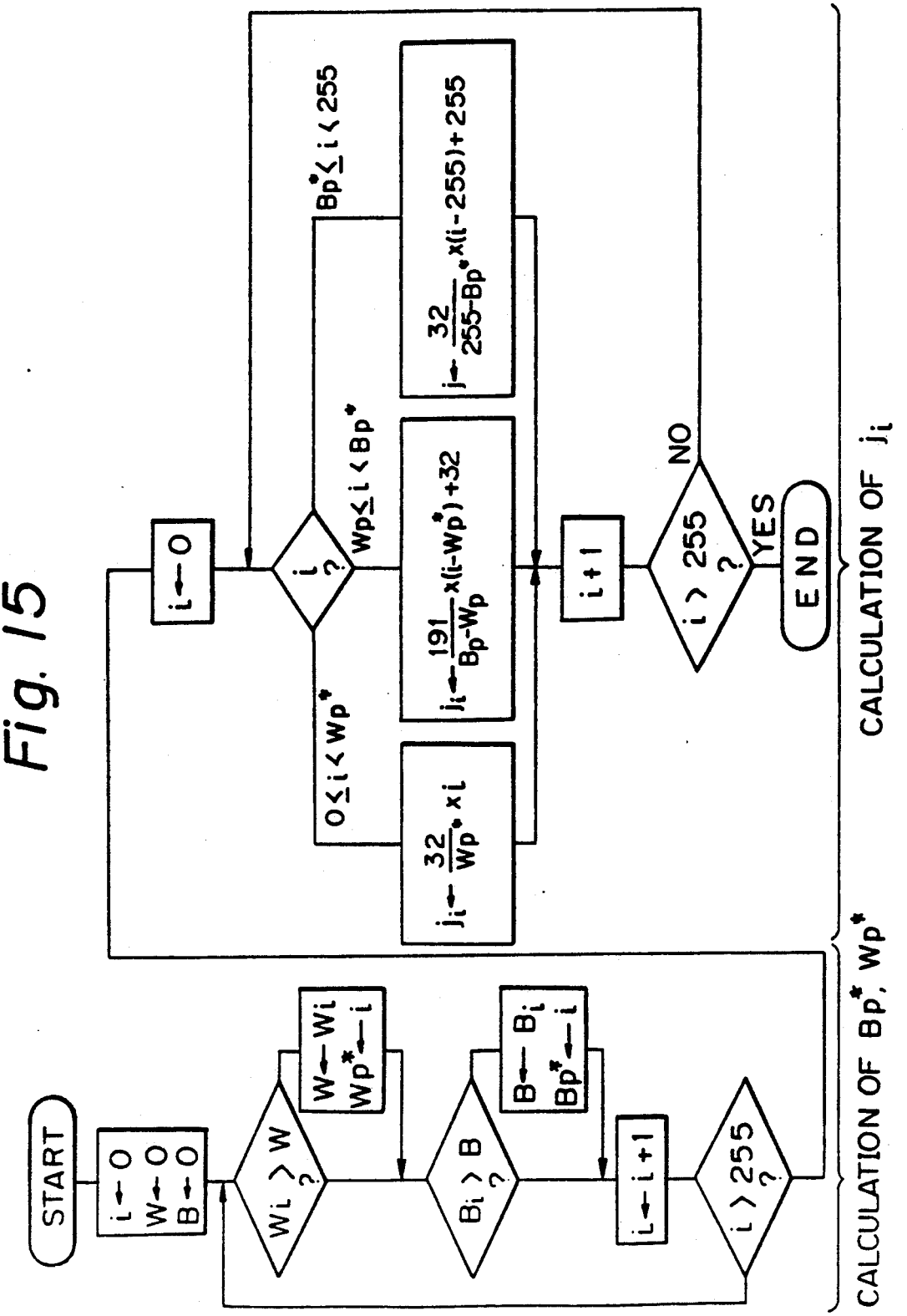

Fig.16(a)
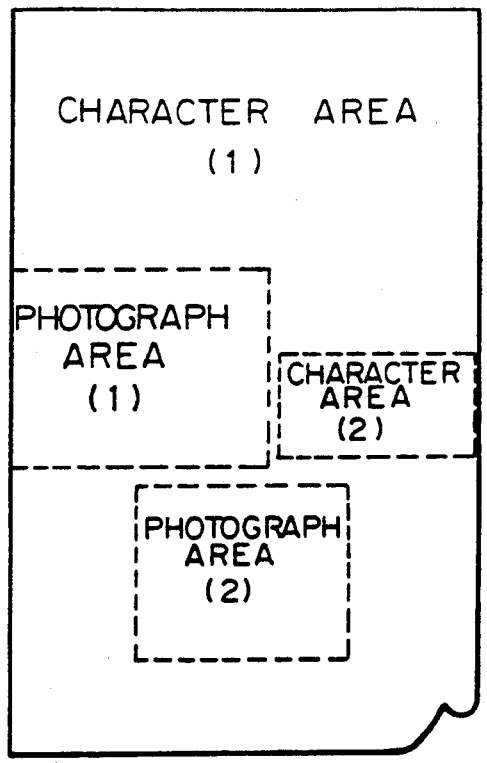
Fig.16(b)
Fig.16(c)
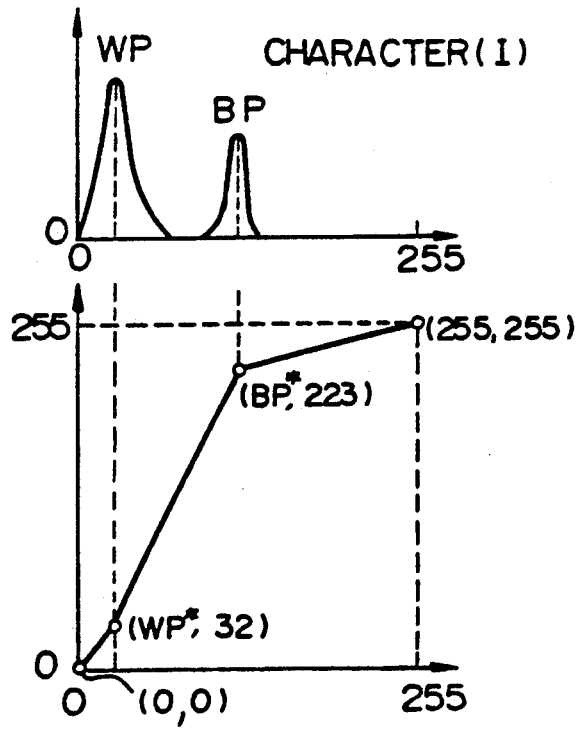

IMAGE QUALITY CONTROL APPARATUS CAPABLE OF DENSITY-CORRECTING PLURAL AREAS OF DIFFERENT TYPES

This application is a division of application Ser. No. 081,721, filed Aug. 4, 1987, now U.S. Pat. No. 4,903,145.

BACKGROUND OF THE INVENTION

The present invention relates to an apparatus for controlling image quality of a multi gray level image.

In a conventional apparatus for reading and outputting a multi-gray-level image, a density of an image to be read is detected and a density of an output image is controlled on the basis of a detected density value.

Assume that an original to be read is an image having areas of different density distributions, such as an original including both character and photograph areas. If the character and photograph areas are controlled on the basis of an identical control scheme, inappropriate density output levels are inevitably obtained.

Multi-gray level image data often has a portion corresponding to a specific image area having an important meaning. In this case, an output image must be formed such that the important image area is emphasized. No conventional apparatuses completely satisfy this need. Therefore, a demand has arisen for satisfying this need.

SUMMARY OF THE INVENTION

The present invention has been made in consideration of the above situation, and has as its object to provide an image quality control apparatus capable of producing an image having optimal density levels regardless of the density distributions of the originals.

It is another object of the present invention to provide an image quality control apparatus capable of performing optimal density conversion for an original including areas of different density distributions.

It is still another object of the present invention to provide an image quality control apparatus capable of partially emphasizing an image by referring to a density of the part of the original.

The above and other objects, features, and advantages of the present invention will be apparent from the following detailed description in conjunction with the accompanying drawings.

BRIEF DESCRIPTION OF THE DRAWINGS

FIG. 3 is a flow chart for explaining procedures in image reading;

FIG. 13 is a timing chart for explaining the operation of the histogram calculator in FIG. 12;

FIG. 14 is a flow chart for explaining table calculation of a photograph area;

FIG. 15 is a flow chart for explaining table calculation of a character area;

FIG. 16(a) is a table showing image areas;

FIGS. 16(b) to 16(i) are graphs showing the histogram density conversion tables corresponding to the image areas shown in FIG. 16(a);

DETAILED DESCRIPTION OF THE PREFERRED EMBODIMENTS

Preferred embodiment of the present invention will be described with reference to the accompanying drawings.

Figure 2A:
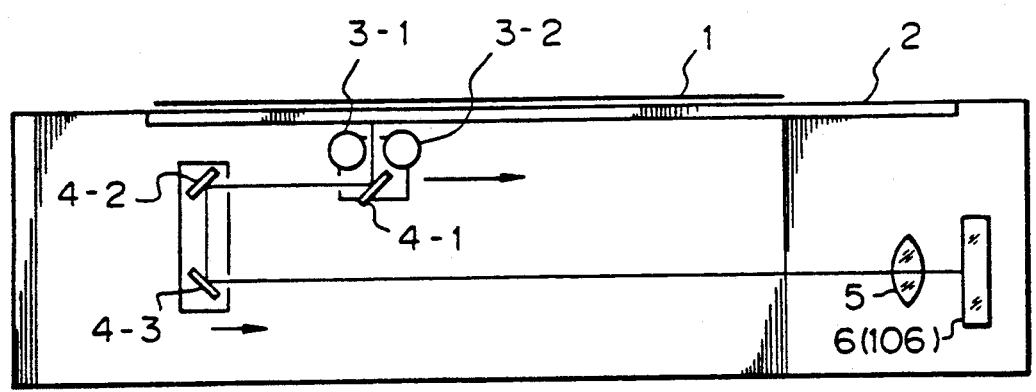
FIGS. 2(a) and 2(b) are respectively a side view and a front view of an image reading apparatus.
Figure 2B:
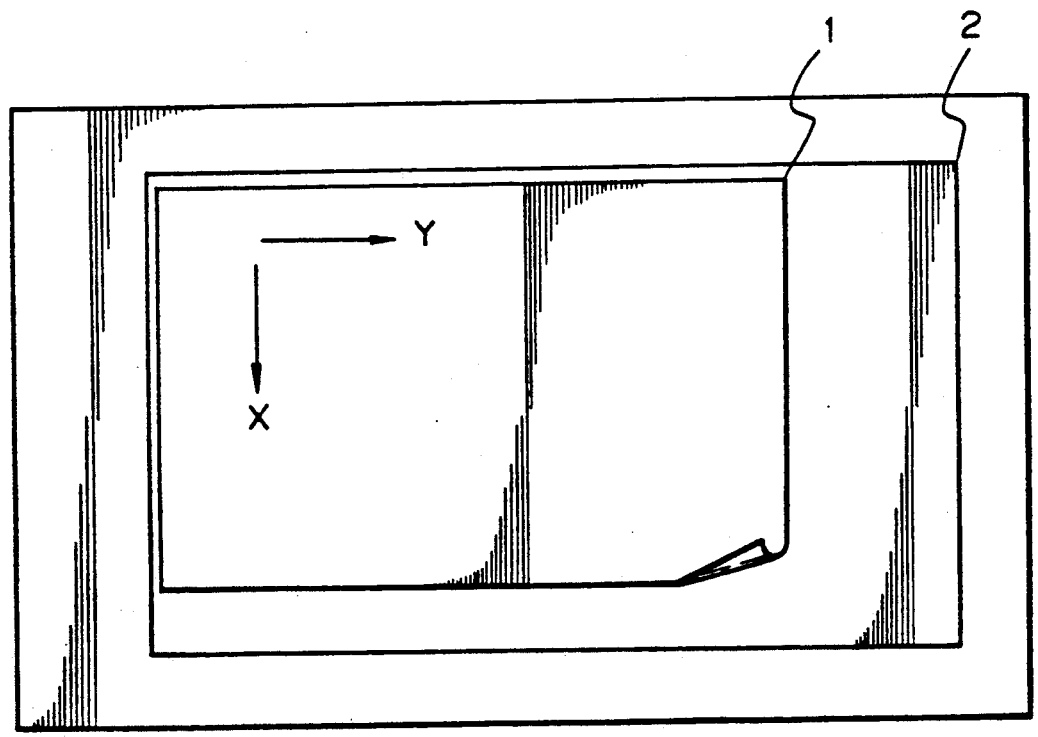

FIGS. 2(a) and 2(b) are respectively a side view and a plan view of an image reading apparatus according to an embodiment of the present invention. The image reading apparatus includes a transparent original table 2 on which an original 1 to be read is placed, lamps 3-1 and 3-2 for illuminating the original 1, mirrors 4-1, 4-2, and 4-3, a lens 5, and a CCD 6.

An image of the original 1 illuminated by the lamps 3-1 and 3-2 is formed on the CCD 6 through the mirrors 4-1, 4-2, and 4-3, and the lens 5.

The CCD 6 performs electrical scanning (to be referred to as main scanning hereinafter, i.e., scanning along the X direction) on the original. At the same time, the lamps 3-1 and 3-2, and the mirrors 4-1, 4-2, and 4-3 perform mechanical scanning (to be referred to as subscanning hereinafter, i.e., scanning in the Y direction) thereby scanning and reading the original image.

FIG. 3 shows image reading procedures in this embodiment. In step 17, image area designation (to be described in detail later) is performed. Prescanning is then performed in step 18 before regular scanning for outputting an image is performed, thereby fetching feature parameters of the original 1.

In step 19, the feature parameters obtained in step 18 are used to form a density conversion table.

Regular scanning is performed in step 20 in accordance with the density conversion table obtained in step 19. The original is then read and at the same time an image is output.

Figure 4A:
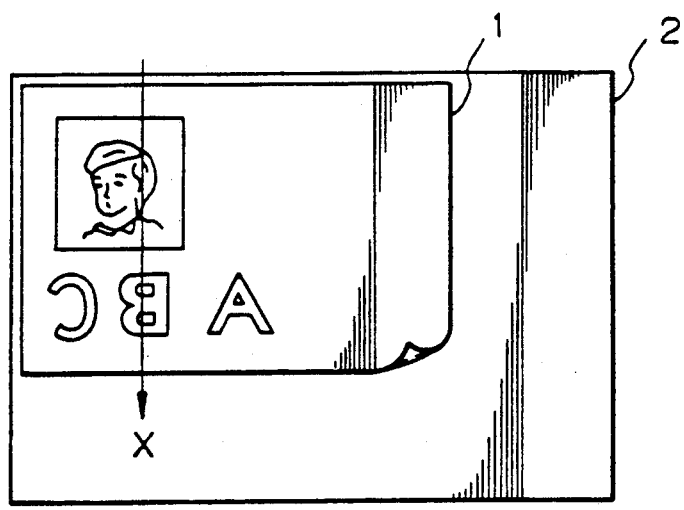
FIGS. 4(a) and 4(b) show an image signal of one main scanning line and various feature parameters.
Figure 4B:
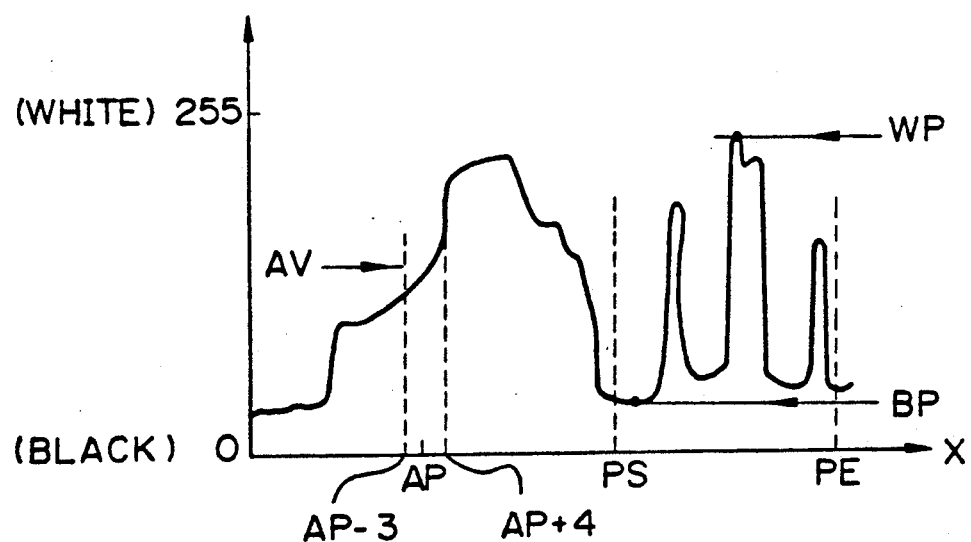

Referring to FIGS. 4(a) and 4(b), the feature parameters of the original will be described. Assume that the original 1 shown in FIG. 4(a) is given. If a white level is defined as 0 and a black level is defined as 255 in a given main scanning line, an output, and feature parameters, after A/D conversion, are given as follows.

An average density AV is given by averaging the density values of eight points (AP−3) to (AP+4) with reference to a main scanning position AP. A maximum white level WP and a maximum black level BP are given in a main scanning interval (PS, PE) designated in advance.

When an output after A/D conversion from the CCD at a main scanning position i (=0, 1, 2, 3, ...) is defined as d(i), the following equations are given:

$$AV = (\frac{1}{8}) \sum_{i=AP-3}^{AP+4} d(i)$$

$$WP = \min_{PS \leq i \leq PE} (d(i))$$

$$BP = \max_{PS \leq i \leq PE} (d(i))$$

In this embodiment, the average density AV is used to detect gradation information of the original The main scanning position AP is assigned to a portion, such as a photograph area, the gradation information of which is important.

The maximum white and black levels WP and BP are used to detect the maximum white and black levels and are assigned to the points PS and PE (e.g., a character area) where the density information of the character and background areas is important.

Figure 5A:
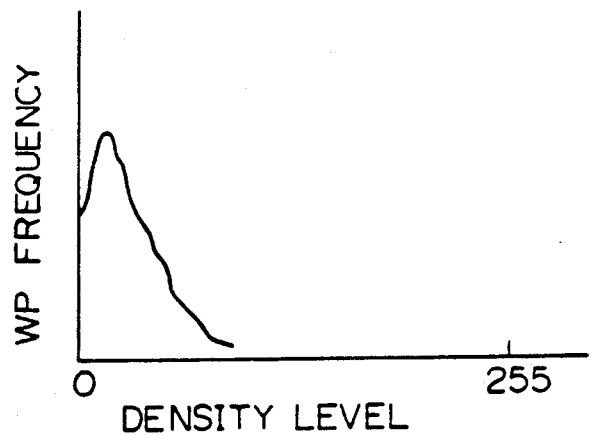
FIGS. 5(a) to 5(c) are graphs showing histograms of the feature parameters.
Figure 5B:
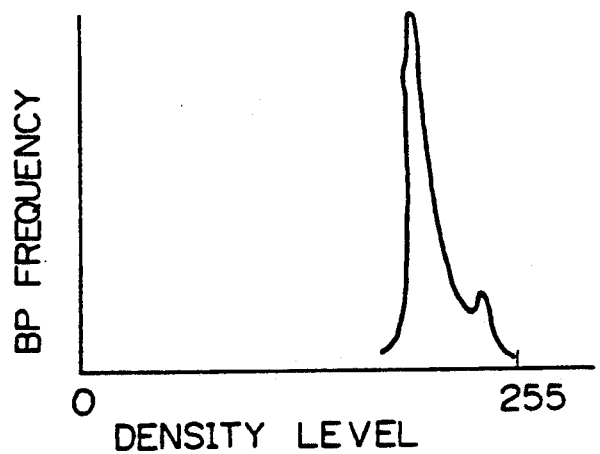
Figure 5C:
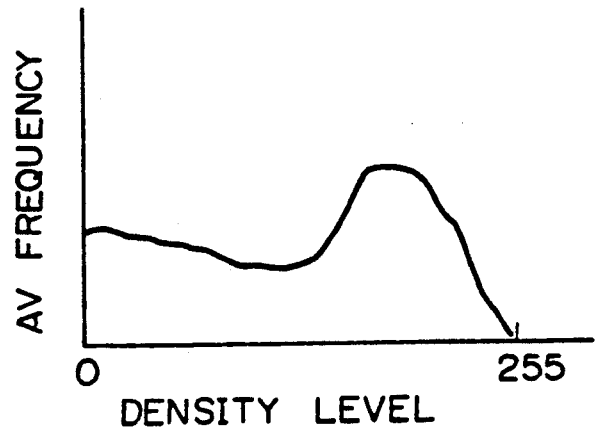

The values of the WP, BP and AV detected in units of main scanning lines are counted and are used for making histograms and density conversion tables, as shown in FIGS. 5(a), 5(b), and 5(c).

Figure 7:
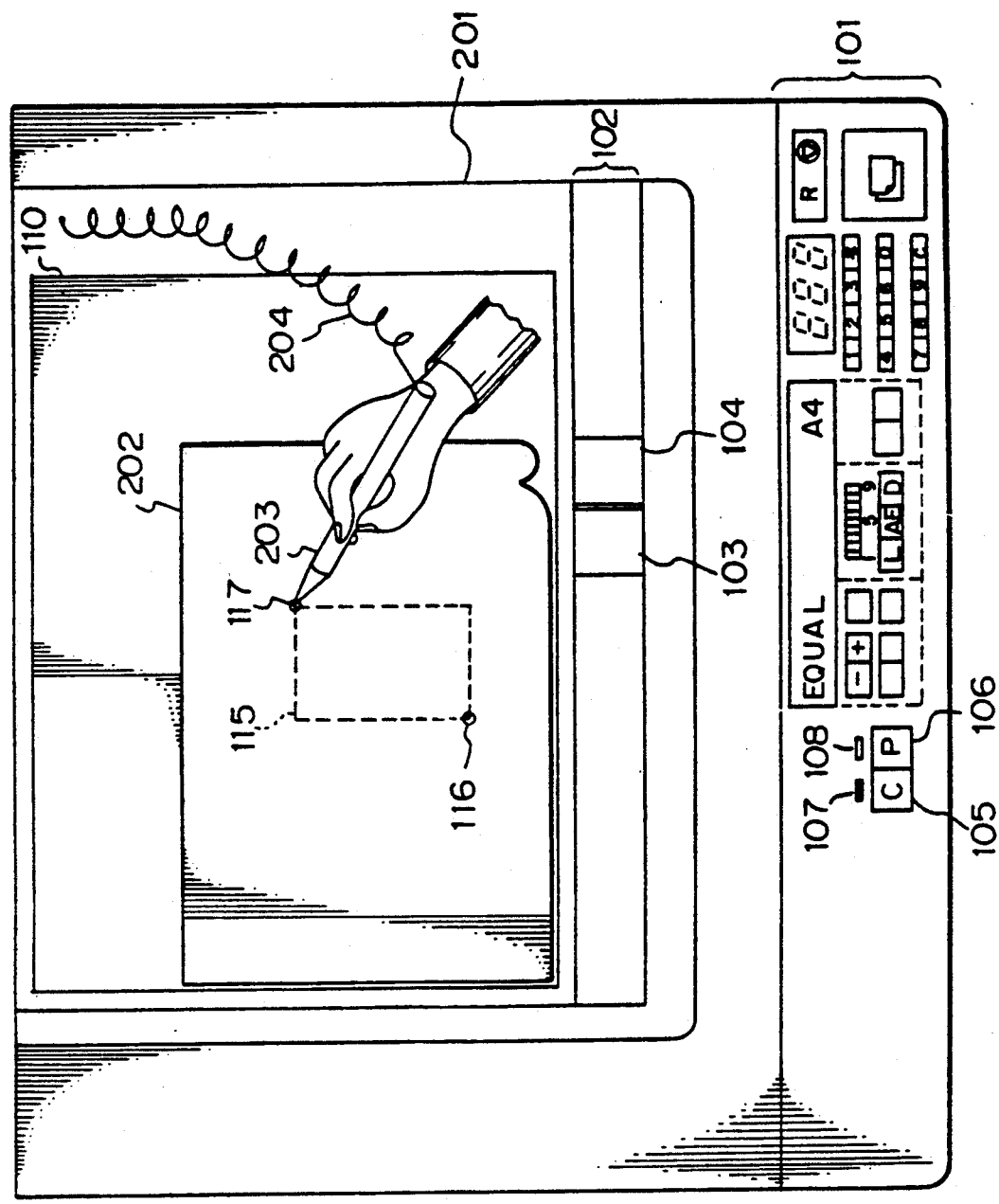
FIG. 7 is a plan view showing an operation panel.

The area designation procedures in this embodiment will be described. FIG. 7 is a plan view of an operation panel of the image reading apparatus.

A display and key unit 101 is used for copying. The unit 101 is not directly associated with the present invention and a detailed description thereof will be omitted.

The display and key unit 101 includes a character original key 105 and a photograph original key 106 which are selectively used to designate the type of an original portion outside a designated area. The unit 101 also includes indicator LEDs 107 and 108 for the keys 105 and 106. One of the LEDs 107 and 108 is turned on to indicate the selected one of the character and photograph designation modes.

A digitizer 201, an original 202, a touch pen 203, and a wire 204 are located above (FIG. 7) the display and key unit 101. The digitizer 201 includes an operation input area 102. Desired contents are input with the touch pen 203 in the operation input area 102.

A character area designation key 103 and a photograph area designation key 104 are arranged in the operation input area 102.

The original 202 is placed in an original area 110 and a desired area of the original 202 is designated therein.

Figure 8:
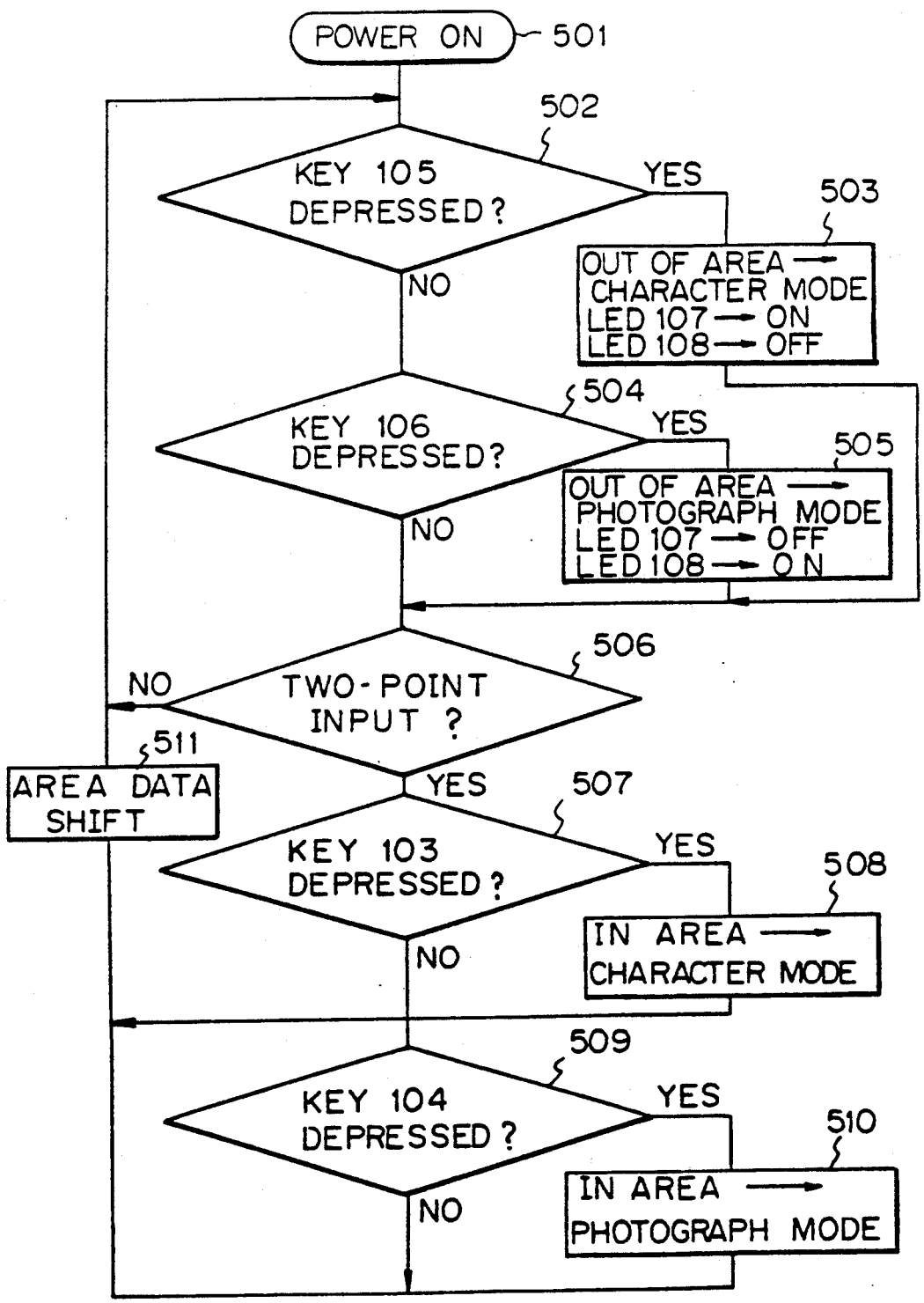
FIG. 8 is a flow chart showing procedures in area designation.

FIG. 8 is a flow chart for explaining area designation procedures. The program of this flow chart is stored in a ROM (to be described later).

When a power switch is turned on in step 501 and the key 105 is depressed in step 502, the character mode is set for "out of area" in step 503. Corresponding data is stored in the predetermined area of an editing RAM 19 (to be described later). At the same time, the LED 107 is turned on and the LED 108 is turned off.

However, if the key 106 is depressed in step 504, the photograph mode is set for "out of area" in step 505. Data is stored in the predetermined area of the editing RAM 19. In this case, the LED 108 is turned on and the LED 107 is turned off. When two diagonal points for designating a rectangular area are not input with the touch pen in step 506, the flow returns to step 502. However, if two points are input, the corresponding position data is stored in the editing RAM 19, and the flow advances to step 507. If the key 103 is depressed in step 507, the character mode is set for "in area", and the data is stored in editing RAM 19. In step 509, when the key 104 is depressed, the photograph mode is set for "in area" in step 510. Data is stored in the editing RAM 19. The area-data area of the RAM 19 is shifted, and the flow returns to step 502. The above operation is repeated to perform designation of a plurality of areas and setting of the character/photograph mode.

By the above flow, a plurality of rectangular areas and character/photograph modes are grouped.

Figure 1:
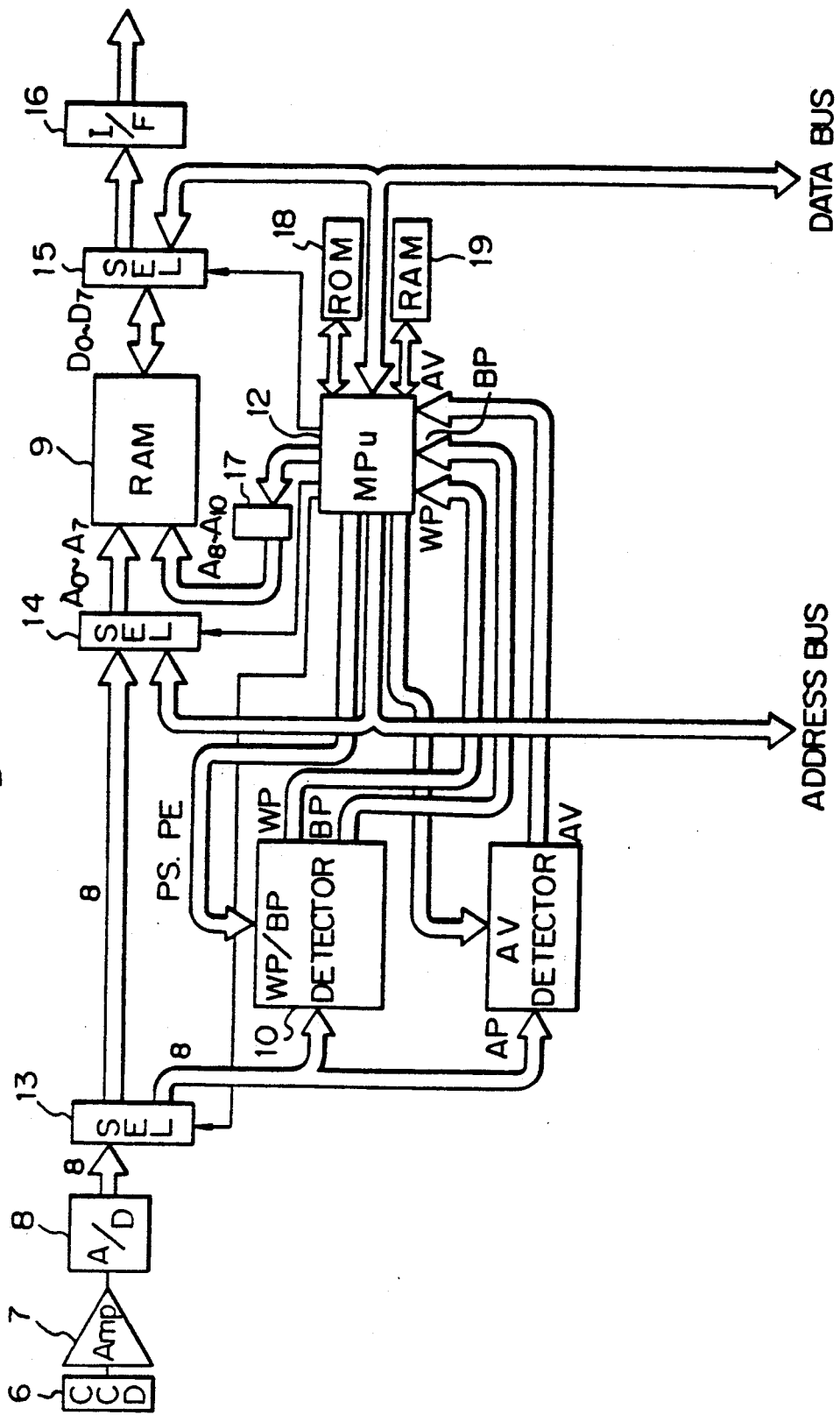
FIG. 1 is a block diagram showing an electrical arrangement of an image quality control apparatus according to an embodiment of the present invention.

FIG. 1 is a block diagram showing an electrical arrangement of the image quality control apparatus of this embodiment.

The image quality control apparatus includes the CCD 6, an inverting amplifier 7, an A/D converter 8, a density conversion RAM 9, a white peak/black peak detector (to be referred to as a WP/BP detector hereinafter) 10, an interval average value- detector (to be referred to as an AV detector hereinafter) 11, an MPU 12, selectors 13, 14, and 15, and a latch 16 for an output interface 17. A ROM 18 stores programs shown in FIGS. 3 and 8. The editing RAM 9 stores area data (to be described later).

An image signal read by the CCD 6 is inverted and amplified by the amplifier 7 and is quantized by the A/D converter 8 into 8-bit data. The 8-bit data is sent to the selector 13.

In pre-scanning, the MPU 12 designates a peak detection interval specified by the points PS and PE in the WP/BP detector 10 and designates the point AP in the AV detector 11. The selector 13 is switched to the lower side in FIG. 1 and thus data from the A/D converter 8 is sent to the WP/BP detector 11. The values of the feature parameters WP, BP, and AV are calculated in units of main scanning lines and are sent to the MPU 12.

When the MPU 12 receives the values of the feature parameters WP, BP, and AV, the MPU counts them for a necessary subscanning interval corresponding to the designated area and forms histograms shown in FIGS. 5(a) to 5(c). Alternatively, the points PS, PE, and AP are changed during subscanning to form feature parameter histograms of a nonrectangular area or a plurality of areas.

When regular scanning is completed, the selectors 14 and 15 are switched to the lower positions, and the editing RAM 9 is switched to the side of the MPU 12. In addition, a density conversion table is formed on the basis of the WP, BP, and AV histograms and is written in the RAM 9.

In the editing RAM 9, eight bits (D0 to D7) after density conversion are written at the eight lower bits of the address for the data before density conversion in one-to-one correspondence. The upper three address bits (A8 to A10) are updated by the MPU 12 through the latch 17. Therefore, selection for one data point can be performed from a maximum of eight conversion tables.

After the density conversion tables are written in the editing RAM 9, the MPU 12 switches the selectors 13, 14, and 15 to the upper sides (as shown in FIG. 1) and performs regular scanning.

In regular scanning, the MPU 12 selects one of the eight density conversion tables and reads data while selecting an optimal table.

Figure 6A:
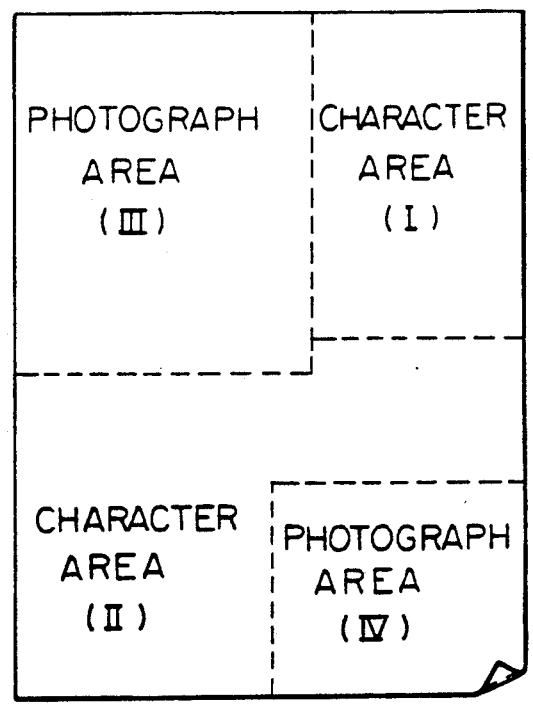
FIG. 6(a) is a table showing image areas.

FIG. 6(a) shows the four image areas. FIGS. 6(b) to 6(i) show WP, BP, and AV histogram shapes and the corresponding density conversion tables suitable for emphasizing these image areas.

Figure 6B:
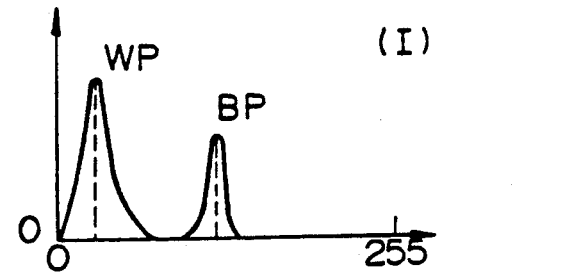
FIGS. 6(b) to 6(i) are graphs showing the histogram density conversion tables corresponding to the image areas shown in FIG. 6(a)
Figure 6C:
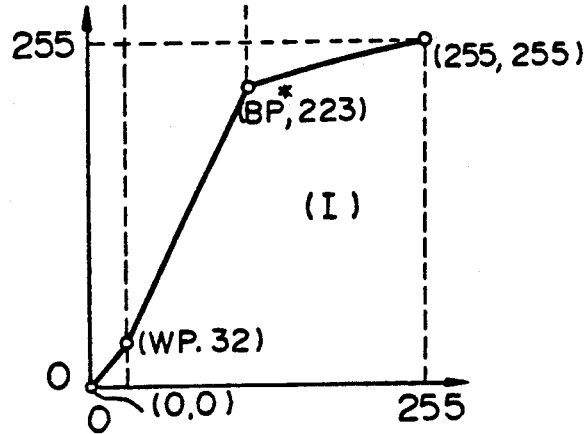
Figure 6D:
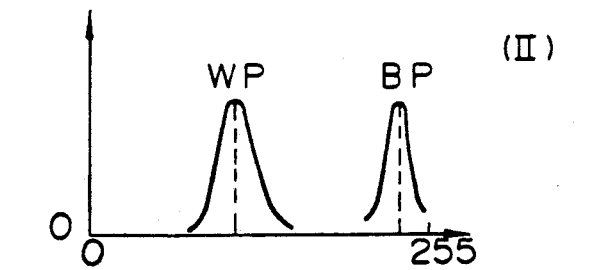
Figure 6E:
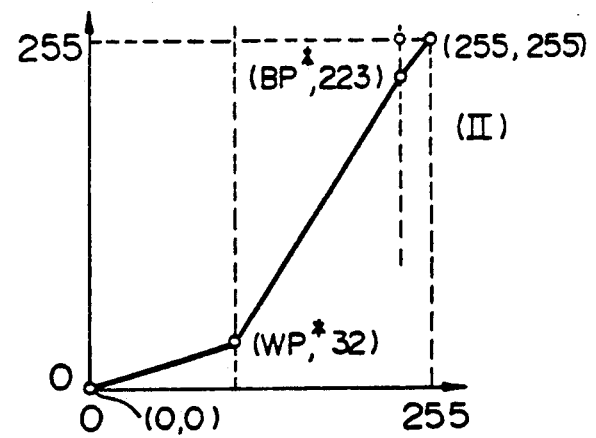

In an original consisting of the four areas shown in FIG. 6(a), an operator inputs these four areas beforehand. Area (I) is the "out of area", and areas (II), (III), and (IV) are given as "in areas". These areas (I) to (IV) are designated as the character/photograph areas according to the above-mentioned procedures. WP and BP histograms of character areas (I) and (II) are shown in FIGS. 6(b) and 6(d). Area (I) is defined as an area having a relatively low density. Area (II) is defined as an area whose background density is relatively high. If density conversion tables for areas (I) and (II) are respectively selected, as shown in FIGS. 6(c) and 6(e), character areas (I) and (II) can be emphasized as compared with the background areas.

Figure 6F:
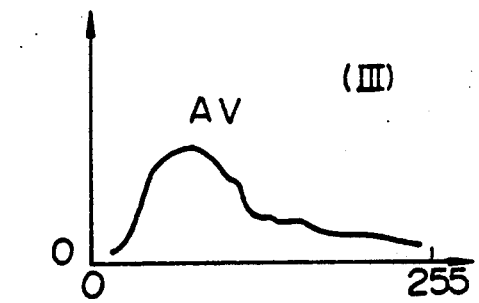
Figure 6G:
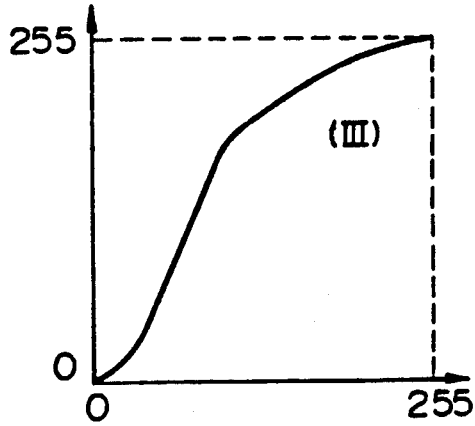
Figure 6H:
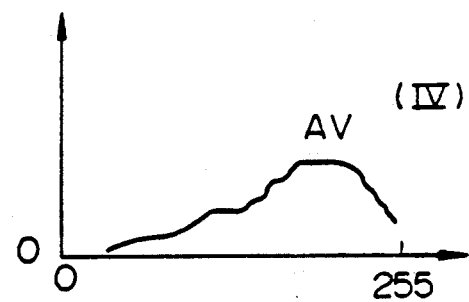
Figure 6I:
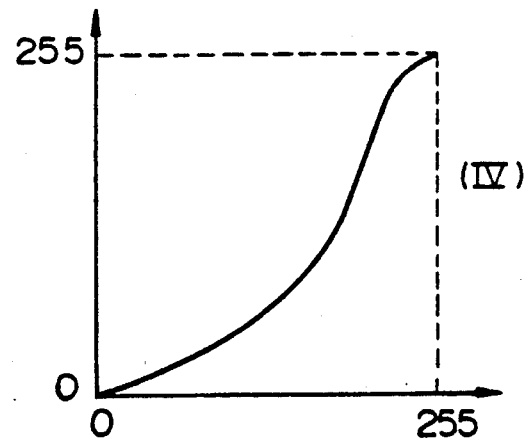

AV histograms in photograph areas (III) and (IV) are shown in FIGS. 6(f) and 6(h). Area (III) is an area the density distribution of which is concentrated in a relatively low-density region, and area (IV) is an area the density distribution of which is concentrated in a relatively high-density region. In this case, if density conversion tables in FIGS. 6(g) and 6(i) are selected for areas (III) and (IV), image emphasis can be performed such that a large number of gray scale levels are given for the density having a high frequency.

The four density conversion tables in FIGS. 6(c), 6(e), 6(g), and 6(i) are written in the editing RAM 9 and can be selectively read out by updating the upper three address bits A8 to A10 under the control of the MPU 12.

During main scanning and subscanning for regular scanning, the upper three address bits A8 to A10 are updated to correct the densities in the corresponding areas.

If density correction of four areas (I), (II). (III), and (IV) is performed using the respective density conversion tables shown in FIGS. 6(c), 6(e), 6(g), and 6(i), an image having emphasized areas can be output.

If the character and photograph areas (I) and (IV) include important portions to be emphasized, the density conversion table shown in FIG. 6(c) is used for the character areas (I) and (II), while the density conversion table shown in FIG. 6(f) is used for the photograph areas (III) and (IV) to perform density correction.

Density conversion curves are obtained as follows.

In the photograph mode, the density conversion curve is a curve similar to a curve obtained by integrating the AV histogram curve. As a result, the gradation of the portion having a low frequency is compressed, while the gradation of the portion having a relatively high frequency is expanded, thereby providing a large number of gray scale levels.

Assume that 256 gray scale levels 0 to 255 are provided before and after density conversion. The following equation is given as a density conversion table representing a density conversion curve, and thus the curves corresponding to FIGS. 6(g) and 6(i) can be obtained:

$$j_i = \left( \sum_{k=0}^{i} x_k \right) / \left( \sum_{k=0}^{255} x_k \right) \times 255$$

where i is the density before conversion (i=0 to 63), $j_i$ is the density after conversion (j=0 to 63), and $x_i$ is the frequency before conversion at density i.

The following equation is introduced for density conversion curves for the character area, and the MPU calculates the values according to this equation to obtain curves shown in FIGS. 6(c) and 6(e).

More specifically, using parameters i and j, a curve is obtained by connecting four points (i,j)=(0, 0), (i, j)=(WP*, 32), (i, j)=(BP*, 223), and (i, j)=(255, 255) by polygonal lines (where WP* and BP* are WP and BP maximum values of the WP and BP histograms). The above relation can be rewritten into an equation as follows:

$$j = \begin{cases} 32/WP \cdot i & (0 \leq i < WP) \\ 191/(BP - WP) \cdot (i - WP) + 32 & (WP \leq i < BP) \\ 32/(63 - BP) \cdot (i - 63) + 255 & (BP \leq i \leq 63) \end{cases}$$

In both character and photograph modes, and MPU calculates the values of the density conversion table by using the resultant histograms upon completion of prescanning. The calculated values are written in the editing RAM 9 after the selectors 14 and 15 are switched to the MPU side.

Data corresponding to j (j=0 to 63) is written at an address corresponding to address bits A0 to A7 which correspond to i and A8 to A10 which are designated by the MPU.

Another embodiment of the present invention will be described below. In the above embodiment, the parameters of the entire area are used for the character area, while the average density of the eight points (AP−3) to (AP+4) with respect to the main scanning position AP is used as the feature parameter for the photograph area. However, in the second embodiment, data is sampled every few main scanning lines for each character area while data is scanned every few pixels in each main scanning line for the photograph area in the following manner.

Figure 9:
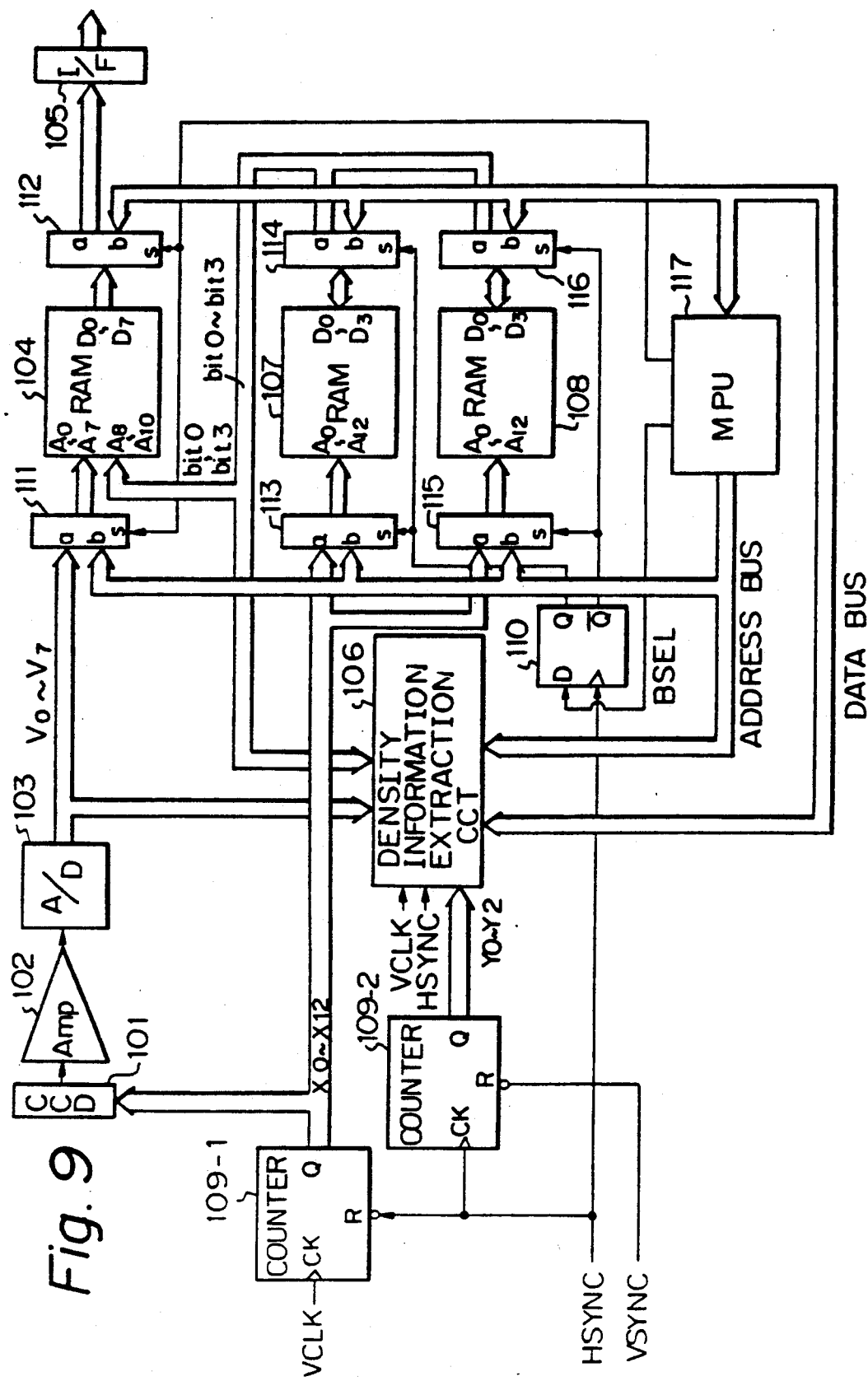
FIG. 9 is a block diagram showing an electrical arrangement of an image quality control apparatus according to another embodiment of the present invention.

FIG. 9 is a block diagram showing an electrical arrangement of this embodiment.

The image quality control apparatus of this embodiment includes a CCD 101, an inverting amplifier 102, an A/D converter 103, a density conversion RAM (to be referred to as a conversion RAM) 104, an output interface 105, a density information extraction circuit 106, editing RAMs 107 and 108, a main scanning counter 109-1, a subscanning counter 109-2, a D flip-flop (to be referred to as a DFF hereinafter) 110, selectors 111, 112, 113, 114, 115, and 116, and a microcomputer (to be referred to as an MPU hereinafter) 117.

An image signal read by the CCD 101 is inverted and amplified by the amplifier 102, and the resultant image signal is sent to the selector 111.

As shown in FIG. 9, a video clock, a main scanning sync signal, and a subscanning sync signal are respectively designated by reference symbols VCLK, HSYNC, and VSYNC.

The editing RAMs will be described in detail below.

The editing RAMs 107 and 108 are RAMs for storing area data (designated and input as previously described, i.e., this area is subjected to image processing). When a bank select signal BSEL is set at high level, the selectors 113 and 114 are set at the a positions. The editing RAM 107 is controlled by the CCD address (main scanning address) from the counter 109-1. In this case, the selectors 115 and 116 are set in the b positions and the editing RAM 108 is controlled by the MPU address. In this state, the editing RAM 108 is connected to the address and data buses of the MPU 117, so that the MPU 117 freely accesses the editing RAM 108.

When the editing RAMs 107 and 108 are connected to the CCD address bus, the addresses of the editing RAMs 107 and 108 correspond to the CCD pixel address. More specifically, the first pixel in the CCD corresponds to address 1 of the RAMs 107 and 108, and the nth pixel corresponds to the address n of the RAMs 107 and 108. An 8-kbyte (8 kbits×8) memory is prepared for a CCD having 5,000 pixels. Therefore, the processing data for processing the mth pixel is stored at address m of the editing RAMs 107 and 108.

Figure 10:
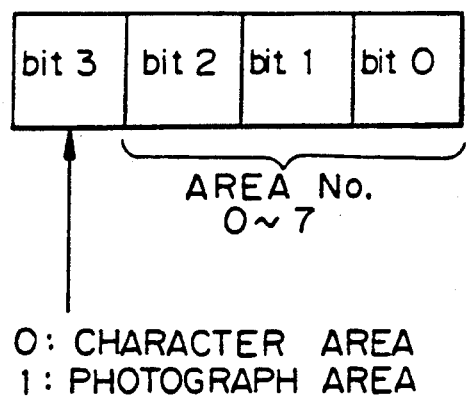
FIG. 10 is a block diagram showing an editing RAM in FIG. 9.

As shown in FIG. 10, each editing RAM 107 or 108 comprises 4 bits. Bit 3 represents if an area of interest is a character or photograph area. If bit 3 is set at logic "0", it represents a character area. However, if bit 3 is set at logic "1", it represents a photograph area. Bit 2 to bit 0 are data representing the area numbers 0 to 7. In this embodiment, a total of 16 areas consisting of eight character areas and eight photograph areas can be designated.

The area designation method of this embodiment is the same as that in the previous embodiment. Area data is stored in the RAMs 107 and 108.

The two editing RAMs 107 and 108 are prepared because the bank select signal BSEL is set at high/low level every scanning line to switch between the RAM accessible by the MPU address and the RAM accessible by the CCD address. During MPU access, the next datum is written in one of the RAMs, and the written datum in the other memory is used for CCD image editing.

In order to update the image editing data, the BSEL is updated to switch the RAM accessible by the CCD address to the RAM accessible by the MPU address. In other words, editing data can be updated a maximum of every scanning line. When the image editing data is not changed, i.e., the signal BSEL is not changed, the unchanged image editing data can be used.

The steps in the flow chart in FIG. 3 will be described in detail.

[Pre-scanning]

In pre-scanning, the MPU 117 writes the area number and information representing the photograph or character mode in the editing RAMs 107 and 108 in synchronism with scanning while the selectors 113 to 116 are switched according to the density area designation results In this case, the editing RAM which is not connected to the MPU 117 is controlled by the CCD main scanning address The number (0 to 7) of the area subjected to main scanning and information representing the character or photograph mode are sent to the density information extraction circuit 106. The density information extraction circuit 106 fetches the lower three bits (y0 to y2) of the count of the subscanning counter 109-2 in response to the signals VSYNC and HSYNC.

Figure 11:
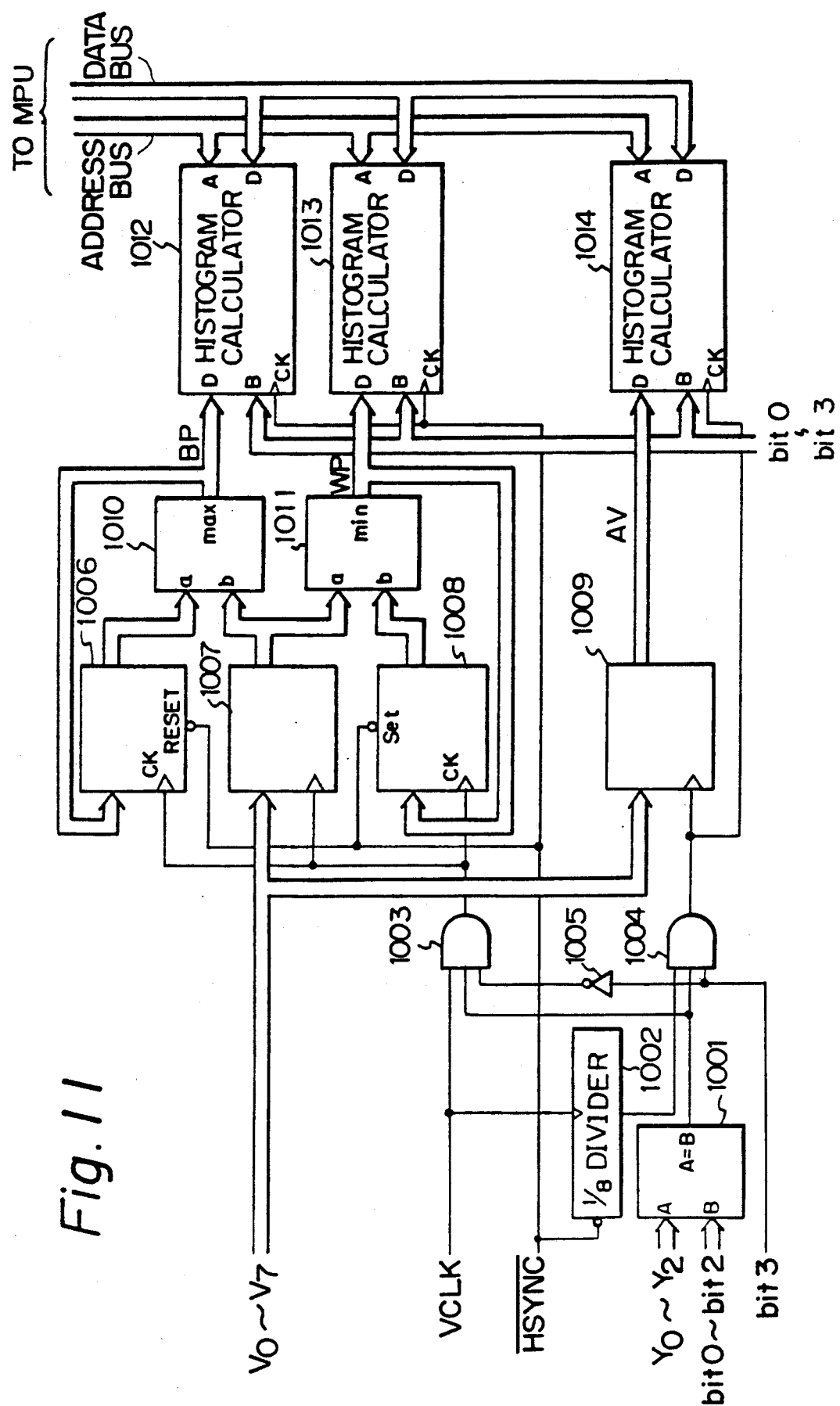
FIG. 11 is a block diagram showing a density information extraction circuit in FIG. 9.

FIG. 11 shows the density information extraction circuit. The extraction circuit includes a three-bit comparator 1001 a ⅛ frequency divider 1002, AND gates 1003 and 1004, an inverter 1005, DFFs 1006, 1007, 1008, and 1009, a maximum value detector 1010, a minimum value detector 1011, and histogram calculators 1012, 1013, and 1014.

When the histograms are calculated every main scanning line for all areas (a maximum of 16 areas), hardware becomes bulky In this embodiment, histograms are made for only one character area and only one photograph area during one main scanning cycle. Eight main scanning cycles constitute one period, and histograms of the respective areas are time-divisionally formed More specifically, histograms of character area (1) and photograph area (1) are formed in main scanning line 0, histograms of character area (2) and photograph area (2) are formed in main scanning line 1, ..., and histograms of character area (7) and photograph area (7) are formed in main scanning line 7. It should be noted that lines not including designated areas are not scanned.

The comparator 1001 determines this decision. If lower three bits y0 to y2 of the subscanning counter output are not equal to output bit 0 to bit 2 of the editing RAM, the gates 1003 and 1004 are kept disabled (i.e., kept at "L" level).

In the character area, maximum and minimum values of all pixels in the area during one main scanning cycle are calculated and defined as WP and BP, respectively.

In the photograph area, it is very difficult to calculate histograms of all pixels due to the limited processing time. Therefore, every eighth pixel is sampled. For this purpose, the video clock signal VCLK is frequency-divided into ⅛.

When image data bits V0 to V7 represent a photograph area, i.e., when bit 3 is set at high level, an output from the gate 1004 serves as a positive edge every eight pixels along both the main scanning and subscanning directions. These positive edges are sent to the histogram calculator 1014, and a histogram can be calculated.

If the image data bits V0 to V7 represent character data, i.e., if bit 3 is set at "L" level, an output from the gate 1003 is generated every eight main scanning lines, and the signal VCLK is output. Therefore, maximum and minimum values during one main scanning cycle are calculated through the DFF 1007. The maximum value circuit 1010 outputs a larger one of inputs a and b. The DFF 1006 is cleared and outputs a signal of logic "0" in response to the main scanning sync signal $\overline{HSYNC}$ of "L" level, i.e., at a start timing of main scanning As a result, the output from the maximum value circuit 1010 is sent to the histogram calculator 1012 as a maximum value during one main scanning cycle.

Similarly, the minimum value circuit 1011 selects the smaller of inputs a and b. A DFF 1008 is set in response to the main scanning sync signal $\overline{HSYNC}$ of "L" level, i.e., at a start timing of main scanning In this case, "FF"=255 is established. As a result, the output from the minimum value circuit 1011 is output to the histogram calculator 1013 as a minimum value during one main scanning cycle.

Figure 12:
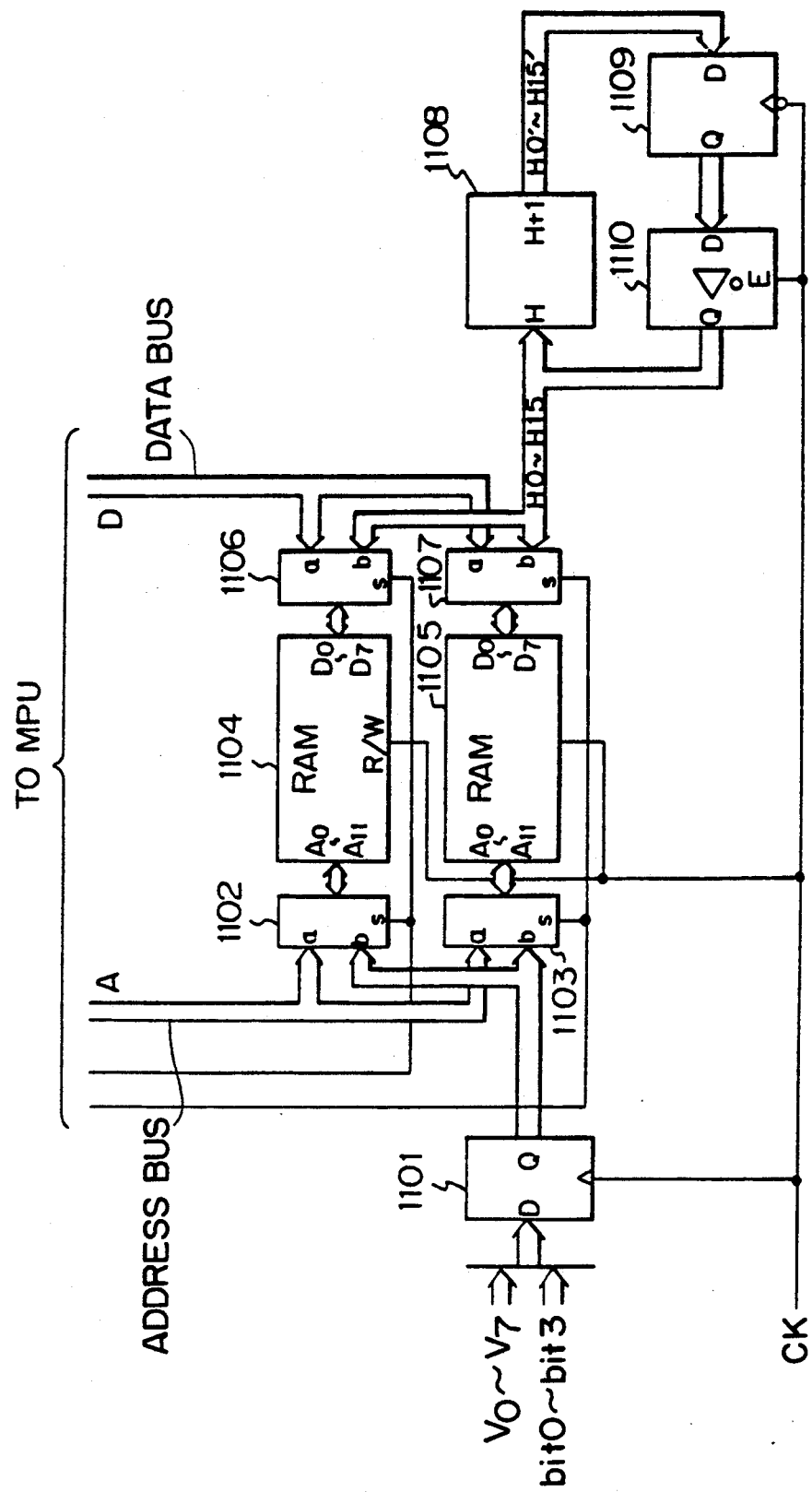
FIG. 12 is a block diagram showing a histogram calculator shown in FIG. 11.

FIGS. 12 is a block diagram of the histogram calculator 1012, 1013, or 1014. FIG. 13 is a timing chart of the histogram calculator. The histogram calculator includes DFFs 1101 and 1109, selectors 1102, 1103, 1106, and 1107, RAMs 1104 and 1105, an adder 1108, and a tristate gate 1110. Before pre-scanning, the selectors 1102, 1103, 1105, and 1106 are set in the a positions, and all "0"s are written in the histogram calculator under the control of the MPU.

During pre-scanning, the selectors 1102, 1103, 1106, and 1107 are connected to the b positions. The values of bit 0 to bit 3 of data (V0 to V7) sent together with the signal CK are input at the addresses of the RAMs 1105 and 1104. Corresponding data is read out in response to the input address data. More specifically, 16-bit data (H0 to H15) is sent to the adder 1108. The adder 1108 increments $x_i$ by one and outputs $x_i+1$ (H0' to H15'). This output data is sent as data (H0 to H15) through the tristate gate 1110 at the trailing edge of the signal CK and is written again in the RAMs 1104 and 1105. As a result, a histogram is formed in the RAMs 1104 and 1105. The resultant histogram is sent to the MPU through the selectors 1102, 1103, 1105, and 1106 upon completion of pre-scanning.

Figure 16D:
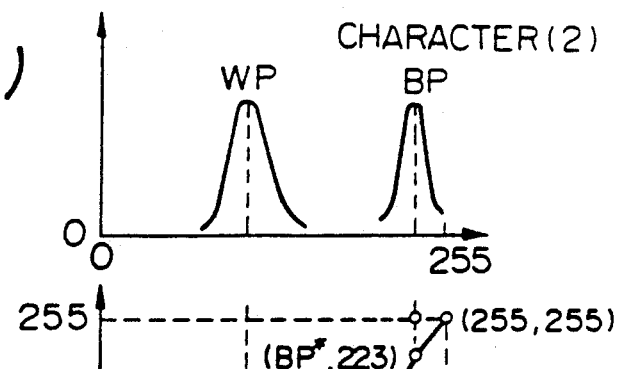
Figure 16E:
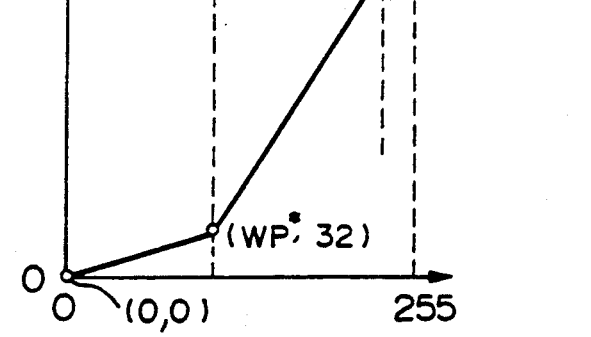

Assume that an original consisting of four areas shown in FIG. 16(a) is given. In other words, the operator inputs these four areas beforehand. WP and BP histograms in character areas (1) and (2) are shown in FIGS. 16(b) and 16(d). Character area (1) is an area the density of which is relatively low, and character area (2) is an area where the background area has a relatively high density. In this case, if density conversion tables in FIGS. 16(c) and 16(e) are selected for character areas (1) and (2), respectively, the output image has character areas (1) and (2) emphasized as compared with the densities of the background areas.

Figure 16F:
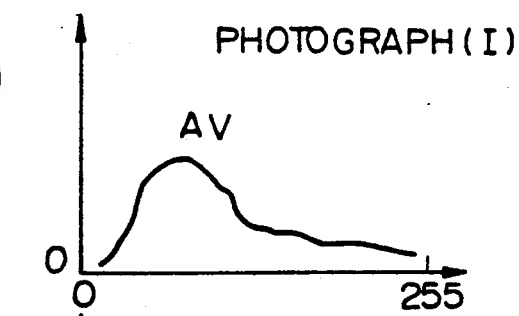
Figure 16G:
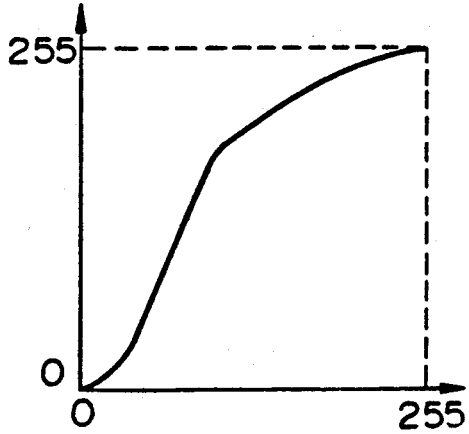
Figure 16H:
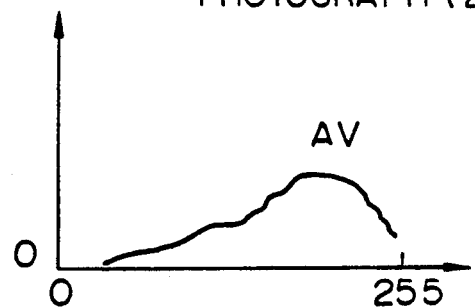
Figure 16I:
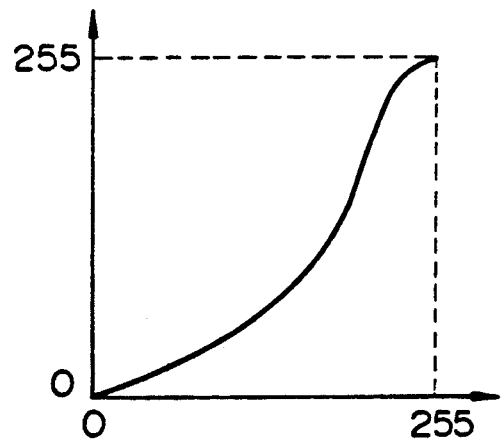

AV histograms of photograph areas (1) and (2) are shown in FIGS. 16(f) and 16(h). Photograph area (1) is an area where the density distribution is concentrated in a relatively low-density region, and photograph area (2) is an area where the density distribution is concentrated in a relatively high-density region. In this case, if density conversion tables for photograph areas (1) and (2) are selected, as shown in FIGS. 16(g) and 16(i), image can be emphasized for the density having a high frequency so as to provide a large number of gray scale levels.

The four density conversion tables shown in FIGS. 16(c), 16(e), 16(g), and 16(i) are written in the conversion RAM 104.

[Regular Scanning]

In the same manner as in pre-scanning, the area number (0 to 7) and the information representing the character or photograph mode are synchronously read out and are input at the upper address bits of the RAM 104, so that the upper three bits A8 to A10 of the RAM 104 can be changed during main scanning and sub-scanning so as to perform density correction of the corresponding area.

If density correction of character area (1), character area (2), photograph area (1), and photograph area (2) is performed using the density conversion tables shown in FIGS. 16(c), 16(e), 16(g), and 16(i), an image having emphasized areas can be output.

[Density Conversion Table Formation]

Upon completion of pre-scanning, the MPU 117 reads out the histograms stored in the RAMs 1104 and 1105 and forms a density conversion table.

Density conversion curves are formed as follows.

In the photograph mode, the density conversion curve is a curve similar to a curve obtained by integrating the AV histogram curve. As a result, the gradation of the portion having a low frequency is compressed, while the gradation of the portion having a relatively high frequency is expanded, thereby providing a large number of gray scale levels.

Assume that 256 gray scale levels 0 to 255 are provided before and after density conversion, as shown in FIG. 16. The following equation is given as a density conversion table representing a density conversion curve, and thus the curves corresponding to FIGS. 6(g) and 6(i) can be obtained (this flow is shown in FIG. 14):

$$j_i = \left(\sum_{k=0}^{i} x_k\right) / \left(\sum_{k=0}^{255} x_k\right) \times 255$$

where i is the density before conversion (i=0 to 63), $j_i$ is the density after conversion (j=0 to 63), and $x_i$ is the frequency before conversion at density i.

The following equation is introduced for density conversion curves for the character area, and the MPU calculates the values according to this equation to obtain curves shown in FIGS. 16(c) and 16(e).

More specifically, using parameters i and j, a curve is obtained by connecting four points (i, j)=(0, 0), (i, j)=(WP*, 32), (i, j)=(BP*, 223), and (i, j)=(255, 255) by polygonal lines (where WP* and BP* are WP and BP maximum values of the WP and BP histograms. The above relation can be rewritten into an equation as follows:

$$j = \begin{cases} 32/WP^* \cdot i & (0 \leq i < WP^*) \\ 191/(BP^* - WP^*) \cdot (i - WP^*) + 32 & (WP^* \leq i < BP^*) \\ 32/(255 - BP^*) \cdot (i - 255) + 255 & (BP^* \leq i < 255) \end{cases}$$

In both character and photograph modes, the MPU calculates the values of the density conversion table by using the resultant histograms upon completion of pre-scanning. The calculated values are written in the editing RAM 9 after the selectors 14 and 15 are switched to the MPU side.

Data corresponding to j (j=0 to 63) is written at the address corresponding to bits A0 to A7 corresponding to i (i=0 to 255) and bits A8 to A10 corresponding to the type of area.

In the above embodiment, the average density of the eight points using the point AP as the central point is calculated for density correction of the photograph area, and the corresponding histogram is formed. However, upper and lower limits are provided to some or all density histograms are provided, and these histograms are integrated. Curves similar to the integrated curves may be used to correct the density as follows. The mechanical structure of the next embodiment is substantially the same as that of FIG. 2(a), and a detailed description thereof will be omitted.

Figure 17:
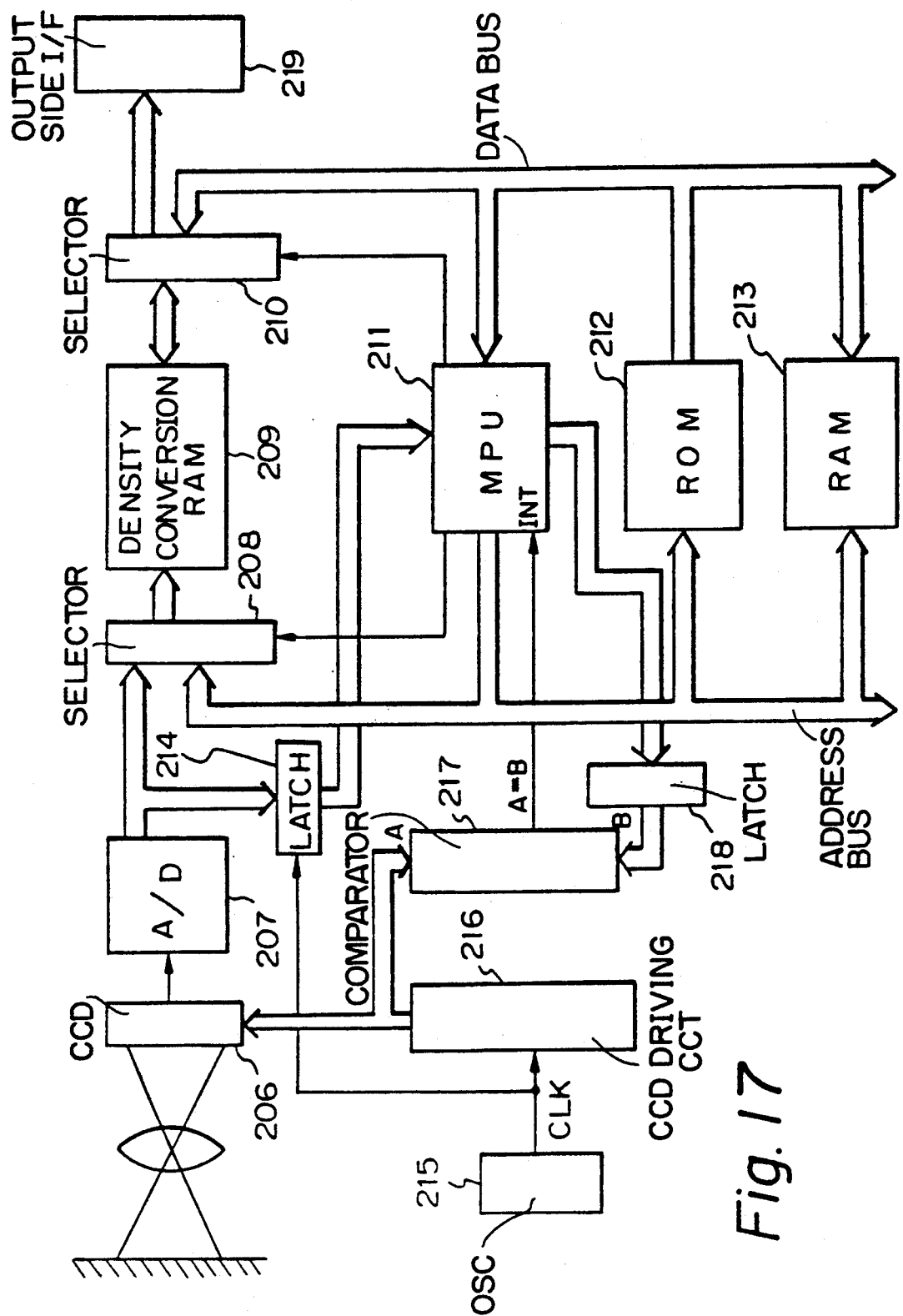
FIG. 17 is a block diagram showing an electrical arrangement of an image quality control apparatus according to still another embodiment of the present invention.

FIG. 17 is a block diagram of an electrical arrangement of the image quality control apparatus of this embodiment. In the image read mode, a CCD driving circuit 216 is operated in response to a signal CLK generated by an oscillator 215, and a CCD 206 performs main scanning. An image read by the CCD 206 is converted by an A/D converter 207 into a digital signal. The digital signal is input to the address input terminal of the density conversion RAM through a selector 208.

The density-converted data is output to an output I/F 219 through a selector 210.

The address bus of a density conversion RAM 209 is controlled by the MPU 211 such that an output from the A/D converter 207 and an instruction from the MPU address bus are selectively output through the selector 208. Similarly, the data bus of the density conversion RAM 209 is controlled by the MPU 211 such that the selector 210 selects one of the data buses for the output side I/F and the MPU 211. A ROM 212 stores programs representing the operation contents of the MPU 211. A RAM 213 serves as a working RAM. The MPU 211 causes a latch 218 to hold a given value through a comparator 217. When the main scanning address value or a few upper address bits coincides with the given value, a coincidence signal is output from the comparator 217, and an output value of the A/D converter 207 can be read through the latch 219.

Figure 18:
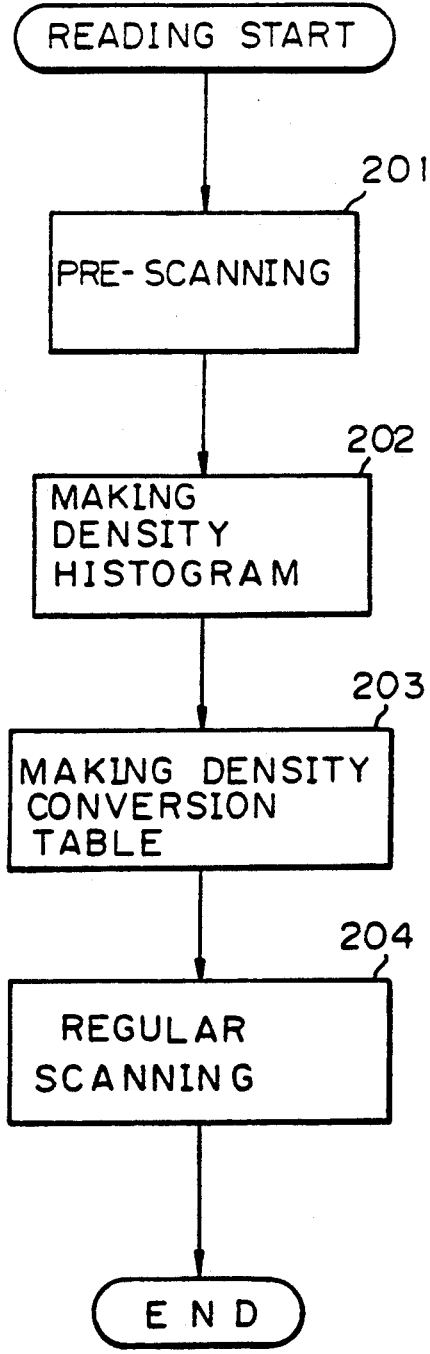
FIG. 18 is a flow chart for explaining procedures in image reading.

FIG. 18 is a flow chart for explaining the operation of the above embodiment. In step 2001, prescanning is performed. In step 2002, density histograms of the original are calculated. In step 2003, density conversion tables are formed on the basis of the resultant histograms. In step 2004, main scanning is performed to read an image.

Pre-scanning and histogram calculation procedures will be described. Pre-scanning is performed before regular scanning is performed to actually read the image and aims at obtaining the density histograms of the original During pre-scanning, a value B given by the MPU 211 is compared by the comparator 217 with a few upper address bits of the address output from the CCD driving circuit 216. If the values A and B coincide with each other, an interrupt signal is input to the MPU 211.

The MPU 211 fetches the read data from the CCD through the latch 214 in response to the interrupt signal. The MPU 211 uses the RAM 213 as a work area and calculates the histograms.

A method of obtaining a density conversion curve using the resultant histograms will be described below.

Figures 19A, 19B:
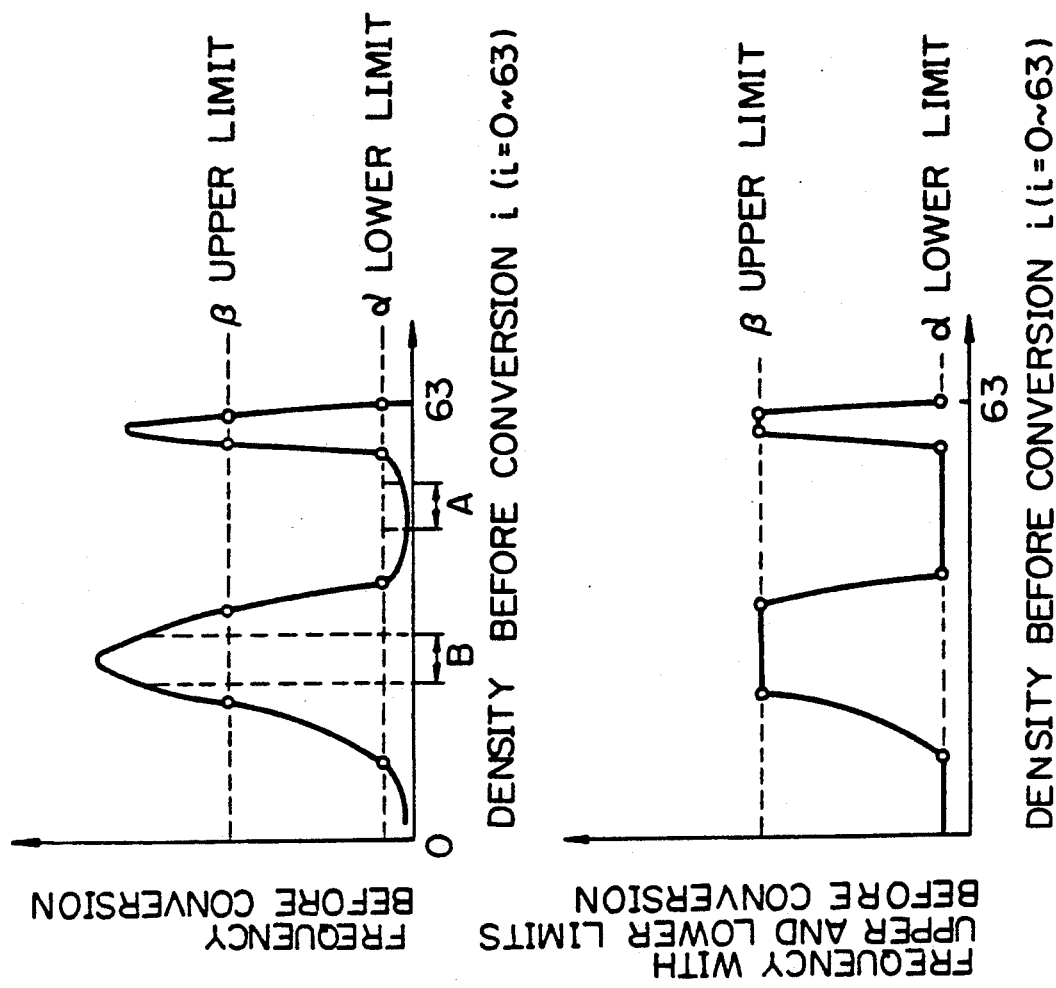
FIGS. 19(a) to 19(c) are graphs showing the relationship between the density histograms and the density conversion tables.
Figure 19C:
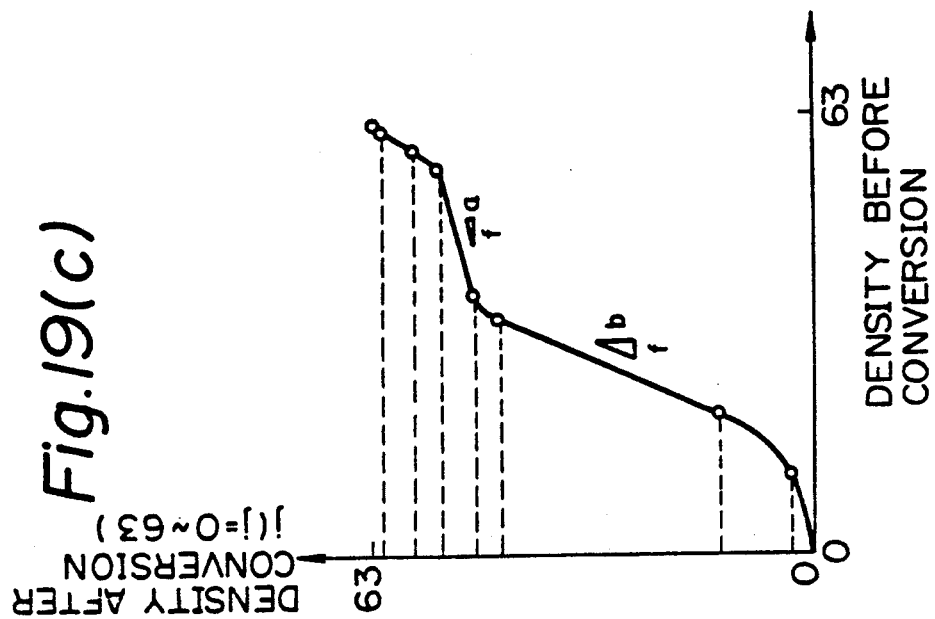
Figure 19D:
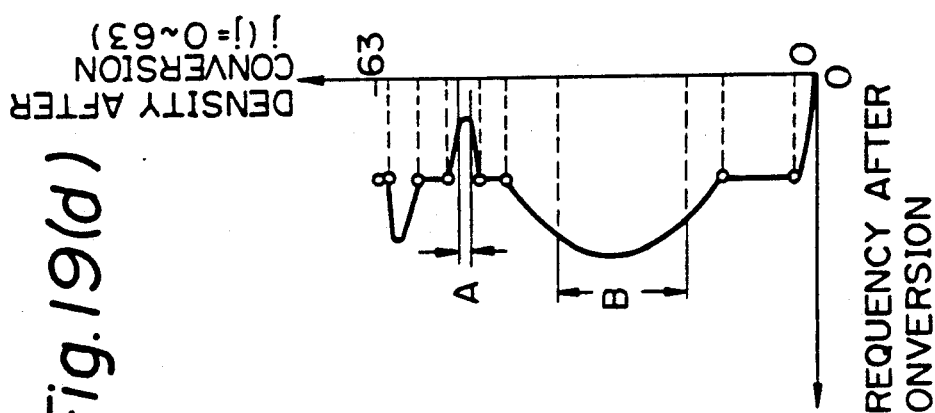

FIG. 19(a) shows a histogram before density conversion, FIG. 19(b) shows a histogram curve obtained by shaping the histogram curve of FIG. 19(a) with constants $\alpha$ and $\beta$ as upper and lower limits, FIG. 19(c) shows a density conversion curve, and FIG. 19(d) shows a histogram after density conversion.

In this embodiment, a curve similar to the one obtained by integrating the histogram curve with upper and lower limits shown in FIG. 19(b) is used as the density conversion curve in FIG. 19(c). As a result, a portion having a relatively low frequency, as indicated by an interval, A is compressed, and a portion having a relatively high frequency, as indicated by an interval B, is expanded, thereby assigning a large number of gray scale levels.

If 64 gray scale levels from level 0 to level 63 are obtained after density conversion, a density conversion table representing a density conversion curve given by the following equation can be used:

$$j = \left(\sum_{i=0}^{i} x'_i\right) / \left(\sum_{i=0}^{63} x'_i\right) \times 63$$

for

-continued $$x'_i = \begin{cases} \beta = (x_i < \beta) \\ x_i = (\beta \leq x_i < \alpha) \\ \alpha = (\alpha < x_i) \end{cases}$$

where i is the density before convertion (i=0 to 63), j is the density after conversion (j=0 to 63), $x_i$ is the frequency before conversion at density i, and $\alpha$ and $\beta$ are the predetermined constants ($0 \leq \alpha < \beta \leq 63$)

A minimum gradient a and a maximum gradient b of the density conversion curve in FIG. 19(c) can be represented by the following equations:

$$a = \alpha / \sum_{i=0}^{63} x'_i \times 63$$

$$b = \beta / \sum_{i=0}^{63} x'_i \times 63$$

As is apparent from the above equations, if the content $\alpha$ is large (small), the gradient a tends to be increased (decreased). Similarly, if the constant $\beta$ is increased (decreased), the gradient b tends to be increased (decreased).

The value of the constant a is a parameter representing the limit of gradation compression in the portion having a low frequency. If the value of the gradient a is excessively small, the range of gray scale levels of the portion having a low frequency is excessively compressed to result in an unnatural image. However, if the value of the gradient a is excessively large, the effect of gray scale compression cannot be satisfactory.

The value of the gradient b is a parameter representing the limit of gray scale expansion for the portion having a high frequency. If the value of the gradient b is excessively increased, the gray scale level range of the portion having a high frequency is excessively expanded to cause a pseudo edge in the output image. However, if the value of the gradient b is excessively small, the effect of gray scale expansion cannot be satisfactory.

Therefore, the above equations are calculated by the MPU 211 and the constants $\alpha$ and $\beta$ are determined to set the values of the gradients a and b to be predetermined values.

After pre-scanning is completed, the MPU 211 calculates the values of the density conversion tables according to the resultant histograms. After the selectors 208 and 210 are changed to the MPU sides, and the calculated values are written in the density conversion RAM 209.

Data corresponding to j (j=0 to 63) is written at the address corresponding to i (i=0 to 63).

After the values of the density conversion table are written in the RAM 209, the MPU 211 switches the selectors 208 and 210 to the sides of the A/D converter 207 and the output side I/F 219. Regular scanning as image reading is then started.

In the above embodiment, 64 gray scale levels as level 0 to level 63 are used as effective levels before and after density conversion- However, the number of gray scale levels can be arbitrarily and independently selected before and after conversion.

In the above embodiment, interleaved sampling is performed for part of the original to obtain density histograms. However, the density histograms of the entire original, histograms of the maximum and minimum density levels during main scanning in place of the density histograms, or a combination thereof may be utilized.

The present invention is not limited to the particular embodiments described above. Various changes and modifications may be made within the spirit and scope of the invention without departing from the scope of the appended claims.

What is claimed is:

1. An image processing apparatus comprising:
   reading means for reading and outputting image data of an original image;
   information generating means for generating information representing image characteristics of a plurality of areas of the original image;
   memory means for storing the information generated by said information generating means;
   correcting means for correcting density of the image data output from said reading means, said correcting means having a plurality of density correction modes corresponding to different respective image characteristics; and
   selection means for selecting, for each area and from among plurality of density correction modes, a density correction mode which meets the image characteristic of such area, based on said information.

2. An image processing apparatus comprising:
   reading means for reading and outputting image data of an original image;
   information generating means for generating information representing image characteristics of a plurality of areas of the original image;
   memory means for storing the information generated by said information generating means;
   correcting means for correcting density of the image data output from said reading means, said correcting means having a plurality of density correction modes corresponding to different respective image characteristics; and
   selection means for selecting, for each area and from among said plurality of density correction modes, a density correction mode which meets the image characteristic of such area, based on said information,
   wherein said reading means performs pre-scanning prior to regular scanning of the original image, and said correcting means detects the density of the respective areas on the basis of the image data output from said reading means and independently corrects the densities of the respective areas during regular scanning of the original image according to the results of such detection.

3. An apparatus according to claim 2, wherein said correcting means has a first density correction mode for photographic areas and a second density correction mode for character areas.

4. An apparatus according to claim 3, wherein, in the first density correction mode, said correcting means calculates an average density for every main-scanning line read by said reading means during pre-scanning of the original image, forms a histogram of the average density by counting the average density in accordance with the designated area, and corrects the density of the image data on the basis of the histogram during regular scanning of the original image.

5. An apparatus according to claim 3, wherein, in the second density correction mode, said correcting means calculates a peak density value for every main-scanning line read by said reading means during pre-scanning of the original image, forms a histogram of peak values by counting the peak values according to the area designated by said designating means, and corrects the density of the image data according to the histogram during regular scanning.

6. An apparatus according to claim 4, wherein said correcting means performs density correction according to a curve obtained by integrating a curve of the histogram in the first density correction mode.

7. An apparatus according to claim 4, wherein said correcting means calculates an average density for image data of part of one main-scanning line in the first density correction mode.

8. An apparatus according to claim 6, wherein said correcting means calculates an average density for image data of part of one main-scanning line in the first density correction mode.

9. An apparatus according to claim 5, wherein the peak values are maximum and minimum values.

10. An apparatus according to claim 1, further comprising designating means for designating an arbitrary area of the original image.

11. An image processing apparatus comprising:
    input means for entering image data representing an image;
    correcting means for correcting density of the image data entered by said input means;
    memory means for storing a plurality of areas of the image represented by the image data, and information representing image characteristics of the respective areas having a corresponding relation therebetween; and
    control means for controlling said correcting means so that the density correction is performed on each of the plurality of areas in accordance with the image characteristic of each area, based on the information stored in said memory means.

12. An apparatus according to claim 11, wherein said input means further comprises reading means for scanning an original image and entering the image data.

13. An apparatus according to claim 12, wherein said reading means performs pre-scanning prior to regular scanning of the original image, and wherein said correcting means detects the density of the respective areas on the basis of the image data from said reading means and corrects the density of the respective areas independently in accordance with the results of such a detection during the regular scanning of the original image.

14. An apparatus according to claim 12, wherein said correcting means is operable in a first density correction mode for photographic areas and a second density correction mode for character areas.

15. An apparatus according to claim 14, wherein, in the first density correction mode, said correcting means calculates an average density for every main-scanning line read by said reading means during the pre-scanning of the original image, forms a histogram of the average density by counting the average density in accordance with a designated area, and corrects the density of the image data on the basis of the histogram during the regular scanning of the original image.

16. An apparatus according to claim 14, wherein, in the second density correction mode, said correcting means calculates a peak density value for every main-scanning line read by said reading means during the pre-scanning of the original image, forms a histogram of peak values by counting the peak density values in accordance with a designated area, and corrects the density of the image data on the basis of the histogram during the regular scanning of the original image.

17. An apparatus according to claim 15, wherein said correcting means performs the density correction in accordance with a curve obtained based on the histogram in the first density correction mode.

18. An apparatus according to claim 15, wherein said correcting means calculates an average density for image data of part of one main-scanning line in the first density correction mode.

19. An apparatus according to claim 17, wherein said correcting means calculates an average density for image data of part of one main-scanning line in the first density correction mode.

20. An apparatus according to claim 16, wherein the peak values are maximum and minimum values.

21. An apparatus according to claim 11, wherein said memory means comprises a RAM.

22. An image processing apparatus comprising:
input means for entering multi-value image data representing an image;
correcting means for correcting density of the multi-value image data entered by said input means, said correcting means having a plurality of density correction modes corresponding to different respective image characteristics;
information generating means for generating information representing image characteristics of a plurality of areas of the image represented by the image data;
selection means for selecting, for each area and from among said plurality of density correction modes, a density correction mode which meets the image characteristic of such area, based on said information; and
output means for outputting density of the multi-value image data corrected by said correcting means.

23. An apparatus according to claim 22, wherein said input means further comprises reading means for scanning an original image and entering the image data.

24. An apparatus according to claim 23, wherein said reading means performs pre-scanning prior to regular scanning of the original image, and wherein said correcting means detects the density of the respective areas on the basis of the image data from said reading means and corrects the density of the respective areas independently in accordance with results of such a detection during the regular scanning of the original image.

25. An apparatus according to claim 23, wherein said correcting means is operable in a first density correction mode for photographic areas and a second density correction mode for character areas.

26. An apparatus according to claim 25, wherein, in the first density correction mode, said correcting means calculates an average density for every main-scanning line read by said reading means during the pre-scanning of the original image, forms a histogram of the average density by counting the average density in accordance with a designated area, and corrects the density of the image data on the basis of the histogram during the regular scanning of the original image.

27. An apparatus according to claim 25, wherein, in the second density correction mode, said correcting means calculates a peak density value for every main-scanning line read by said reading means during the pre-scanning of the original image, forms a histogram of peak values by counting the peak density value in accordance with a designated area, and corrects the density of the image data on the basis of the histogram during the regular scanning of the original image.

28. An apparatus according to claim 26, wherein said correcting means performs the density correction in accordance with a curve obtained based on the histogram in the first density correction mode.

29. An apparatus according to claim 26, wherein said correcting means calculates an average density for image data of part of one main-scanning line in the first density correction mode.

30. An apparatus according to claim 28, wherein said correcting means calculates an average density for image data of part of one main-scanning line in the first density correction mode.

31. An apparatus according to claim 27, wherein the peak values are maximum and minimum values.

32. An image processing apparatus comprising:
input means for entering image data representing an image;
designating means for designating an area of the image represented by the image data;
calculating means for calculating a density histogram on each of a plurality of areas of the image designated by said designating means; and
processing means for processing the image data entered by said input means on the basis of a calculation result obtained by said calculating means.

* * * * *

UNITED STATES PATENT AND TRADEMARK OFFICE
CERTIFICATE OF CORRECTION

PATENT NO. : 5,075,788
DATED : December 24, 1991
INVENTOR(S) : MASAHIRO FUNADA

Page 1 of 3

It is certified that error appears in the above-identified patent and that said Letters Patent is hereby corrected as shown below:

COLUMN 1

Line 12, "multi gray" should read --multi-gray--.
Line 14, "multi-gray-level" should read --multi-gray level--.
Line 58, "4(b" should read --4(b)--.

COLUMN 2

Line 27, "19(c)" should read --19(d)--.
Line 33, "embodiment" should read --embodiments--.

COLUMN 3

Line 24, "original" should read --original.--.

COLUMN 4

Line 30, "value-" should read --value--.
Line 45, "detector 11." should read --detector 10.--.

COLUMN 6

Line 9, "$x_i$" should read --$x_k$--.
Line 29, "and" should read --the--.

COLUMN 7

Line 17, "specifically,." should read --specifically,--.
Line 59, "sults" should read --sults.--.
Line 61, "address" should read --address.--.

UNITED STATES PATENT AND TRADEMARK OFFICE
CERTIFICATE OF CORRECTION

PATENT NO. : 5,075,788
DATED : December 24, 1991
INVENTOR(S) : MASAHIRO FUNADA

It is certified that error appears in the above-identified patent and that said Letters Patent is hereby corrected as shown below:

COLUMN 8

Line 10, "bulky" should read --bulky.--.
Line 15, "formed" should read --formed.--.
Line 53, "scanning" should read --scanning.--.
Line 60, "scanning" should read --scanning.--.

COLUMN 9

Line 19, "1105, and 1106" should read --1106, and 1107--.

COLUMN 10

Line 18, "$x_i$" should read --$x_k$--.
Line 27, "($BP^8$," should read --($BP^*$,--.
Line 29, "histograms." should read --histograms).--.
Line 52, "are provided" should be deleted.

COLUMN 11

Line 18, "latch 219." should read --latch 218.--.
Line 30, "original" should read --original.--.
Line 54, "interval," should read --interval--.

COLUMN 12

Line 51, "and" should be deleted.
Line 63, "conversion-" should read --conversion.--.

UNITED STATES PATENT AND TRADEMARK OFFICE
CERTIFICATE OF CORRECTION

PATENT NO. : 5,075,788

DATED : December 24, 1991

INVENTOR(S) : MASAHIRO FUNADA

It is certified that error appears in the above-identified patent and that said Letters Patent is hereby corrected as shown below:

COLUMN 13

Line 25, "among" should read --among said--.

Signed and Sealed this

First Day of June, 1993

Attest:

MICHAEL K. KIRK

Attesting Officer

Acting Commissioner of Patents and Trademarks